United States Patent
Beck et al.

(10) Patent No.: US 9,537,933 B2
(45) Date of Patent: Jan. 3, 2017

(54) SERVER-CLIENT INTERACTION AND INFORMATION MANAGEMENT SYSTEM

(71) Applicant: Forte Internet Software, Inc., Carlsbad, CA (US)

(72) Inventors: Christopher Clemmett Macleod Beck, Carlsbad, CA (US); Mark Franklin Sidell, Chapel Hill, NC (US); Thomas Knox Gold, La Mesa, CA (US); James Karl Powers, Carlsbad, CA (US); Charles Dazler Knuff, Palomar Mountain, CA (US)

(73) Assignee: Forte Internet Software, Inc., Escondido, CA (US)

( * ) Notice: Subject to any disclaimer, the term of this patent is extended or adjusted under 35 U.S.C. 154(b) by 41 days.

(21) Appl. No.: 14/183,005

(22) Filed: Feb. 18, 2014

(65) Prior Publication Data
US 2014/0164959 A1    Jun. 12, 2014

Related U.S. Application Data

(63) Continuation of application No. 11/943,834, filed on Nov. 21, 2007, now abandoned, which is a continuation-in-part of application No. 11/237,269, filed on Sep. 27, 2005, now abandoned, which is a continuation-in-part of application No. 10/888,612, filed on Jul. 9, 2004, now Pat. No. 8,250,150, which is

(60) Provisional application No. 60/677,141, filed on May 2, 2005.

(Continued)

(51) Int. Cl.
*H04L 29/08* (2006.01)
*H04L 12/58* (2006.01)
*H04L 29/06* (2006.01)

(52) U.S. Cl.
CPC ............. *H04L 67/10* (2013.01); *H04L 12/585* (2013.01); *H04L 51/12* (2013.01); *H04L 67/306* (2013.01); *H04L 67/327* (2013.01); *H04L 12/581* (2013.01); *H04L 12/5855* (2013.01); *H04L 51/04* (2013.01); *H04L 63/102* (2013.01)

(58) Field of Classification Search
CPC ....................................................... H04L 29/08
See application file for complete search history.

(56) References Cited

U.S. PATENT DOCUMENTS 7,197,470 B1 *   3/2007  Arnett .................... G06F 21/31
                                                             705/7.29
7,263,526 B1 *   8/2007  Busey ................. H04L 12/1813
(Continued)

*Primary Examiner* — David Choi
(74) *Attorney, Agent, or Firm* — Donald R. Boys; Central Coast Patent Agency, Inc.

(57) ABSTRACT

An information-sharing system includes a server in a wide-area network coupled to a data repository, software executing on the server, providing services for a first person, wherein the first person is enabled to create one or more personae stored in the data repository, at least one interactive window associated with individual ones of the personae and deployable to one or more electronic appliances, and one or more rule sets associated with individual ones of the personae, the rule sets defining and limiting server functions that may be initiated through individual ones of deployed interactive windows, the interactive windows and rule sets enabling the first person to control identity and contact information made available to users of deployed interactive windows.

16 Claims, 12 Drawing Sheets

Related U.S. Application Data a continuation-in-part of application No. 10/765,338, filed on Jan. 26, 2004, now Pat. No. 8,316,128.

(56) References Cited

U.S. PATENT DOCUMENTS

| | | | | |
|---|---|---|---|---|
| 7,509,290 | B1* | 3/2009 | McKee | H04L 63/083 |
| | | | | 705/50 |
| 2001/0056351 | A1* | 12/2001 | Valentine | G06F 17/30017 |
| | | | | 704/270 |
| 2003/0170267 | A1* | 9/2003 | Paoletti | A61K 39/21 |
| | | | | 424/201.1 |
| 2003/0172067 | A1* | 9/2003 | Adar | G06Q 30/02 |
| 2004/0030740 | A1* | 2/2004 | Stelting | G06F 8/36 |
| | | | | 709/201 |
| 2004/0039990 | A1* | 2/2004 | Bakar | G06F 17/243 |
| | | | | 715/222 |
| 2004/0048670 | A1* | 3/2004 | Rowe | G06Q 30/0209 |
| | | | | 463/42 |
| 2004/0148207 | A1* | 7/2004 | Smith | G06Q 10/025 |
| | | | | 705/6 |
| 2004/0189703 | A1* | 9/2004 | Zhang | G06F 17/3089 |
| | | | | 715/762 |
| 2004/0229600 | A1* | 11/2004 | Saez | H04M 3/436 |
| | | | | 455/417 |
| 2004/0268265 | A1* | 12/2004 | Berger | G06F 1/1622 |
| | | | | 715/752 |
| 2005/0076241 | A1* | 4/2005 | Appelman | H04L 51/12 |
| | | | | 726/4 |
| 2006/0149708 | A1* | 7/2006 | Lavine | G06F 17/30477 |
| 2014/0164959 | A1* | 6/2014 | Beck | H04L 12/585 |
| | | | | 715/753 |

* cited by examiner

SERVER-CLIENT INTERACTION AND INFORMATION MANAGEMENT SYSTEM

CROSS-REFERENCE TO RELATED APPLICATIONS

The present application is a continuation of Ser. No. 11/943,834, filed Nov. 21, 2007, which is a Continuation-in-Part (CIP) to application Ser. No. 11/237,269, filed on Sep. 27, 2005. Priority is claimed to that application for the common disclosure. Ser. No. 11/237,269 was filed as a CIP of Ser. No. 10/888,612 filed on Jul. 9, 2004, and priority is claimed to that application for the common disclosure in the present application as well. Further, Ser. No. 11/237,269 claimed priority to Provisional application 60/677,141 filed on May 2, 2005, and the present application claims priority to the provisional date for the common disclosure. In addition, Ser. No. 10/888,612 was filed as a CIP of Ser. No. 10/765,338, filed on Jan. 26, 2004, and priority is claimed for the present application to that date for the common disclosure. Finally, Ser. No. 10/765,338 was disclosed in Document Disclosure 534,495 filed on Jul. 8, 2003.

BACKGROUND OF THE INVENTION

1. Field of the Invention

The present invention is in the field of social interaction and information management relative to social interactions and pertains particularly to systems and methods enabling identity publishing and publisher contact during business or social interaction in a secure manner protecting the identities of publishers.

2. Discussion of the State of the Art

In the field of social interaction network management, there are network-based systems that exist to provide users with social interaction opportunities. Some social interaction networks are highly structured and moderated networks that impose at least a few conditions on users. One typical condition imposed is that the user has to be logged into a provider site in order to interact with other users belonging to the same network or group.

Depending on network architecture and features, members of the group may, when logged into the group infrastructure, publish information like profile data, contact information, and general media including blogs, pictures, video, documents, etc. Some published information becomes generally available to the public while other information is available to anyone who is also a member to the group and has authenticated correctly. While some controls exist for publishers like abuse reporting, user blocking and the like most identity protective measures are ad hoc and up to the publisher to enforce on a case by case basis. Networks with these types of difficulties include such as Myspace™ Facebook™, and others. There are very few if any measures in place to protect identities of publishers who actively communicate with other users of the group accept for group email and messaging programs that are restricted to group members having accounts with the service. Users and publishers have to be "logged in" to communicate and are restricted to the in-house messaging systems erected and managed for the group.

The inventor is aware of general contact systems that are network-based, which enable users who are not logged into any group or social network to make contact with an individual that has published identity information where the contact parameters of the individual are masked from the user. These systems, an example of which is Linkedin™ are managed as a network of users who simply wish to do business but do not want users to have their email addresses or telephone numbers. Individuals such as these are most often grouped not by any social network, but by association to a business that uses the service. The contact mechanism is published typically on the business Web page of the user. The location of the user's contact information is static meaning that it cannot be readily moved to some other network location. Other limitations include the way that the identity and contact information is presented for interaction.

What is clearly needed is a system and methods for enabling publishers to publish information including options for contacting them while enabling them to enjoy freedom of distribution location of the published information and contact options in a way that provides a user-configurable level of identity protection that may extend past contact parameter masking. Such a system, if used widely, would greatly reduce instances of identity abuse and other related crimes associated with unauthorized acquisition of identity information.

SUMMARY OF THE INVENTION

An information-sharing system is provided and includes a server in a wide-area network coupled to a data repository, software executing on the server, providing services for a first person, wherein the first person is enabled to create one or more personae stored in the data repository, at least one interactive window associated with individual ones of the personae and deployable to one or more electronic appliances, and one or more rule sets associated with individual ones of the personae, the rule sets defining and limiting server functions that may be initiated through individual ones of deployed interactive windows, the interactive windows and rule sets enabling the first person to control identity and contact information made available to users of deployed interactive windows.

In one embodiment, deployment of an interactive window is through creation of code modules or identifiers associated with the interactive window, the code module executable by an electronic appliance to insert second code into a specific application, which second code when executed by the application causes the electronic appliance to establish communication with the server identifying at least the electronic appliance and the application, to retrieve third code and data from the server, which the electronic appliance uses to display the interactive window.

In one embodiment, the at least one interactive window comprises first indicia identifying one of the personae and at least one link having second indicia identifying a mode of action, the at least one link selectable by a second person using the electronic appliance and viewing the interactive window to initiate a request for action to the server. In one embodiment, one or both of the identity indicia of the persona and the modes of action displayed by an interactive window may be varied by the server dependent on one or both of the identity of the electronic appliance and the identity of the application.

In one embodiment having modes of action, the modes of action include at least one of a request for communication with the first person associated at the server with the persona identified in the interactive window and a request for information associated with the first person. In a variation of this embodiment, the request for action identifies a mode of communication. In this embodiment, the modes of communication include one of establishing a live voice call, a text messaging channel, a voice mailbox, and email. In a variation of this embodiment, indication of presence of a first person for receiving a communication is provided in the interactive window.

In one embodiment, a group persona may be created defining a group of individual personae related by any one or more of activity, family, formal membership, political affiliation, or other relationship. In this embodiment, modes of action may comprise sending a message to all or selected ones of the persons in a group identified by the group persona or publishing information to all or selected ones of the persons associated by persona in a group identified by the group persona.

In another embodiment having action links, the server, in response to an action link being selected by a person viewing an interactive window, may request additional information from the person initiating the action link, and may vary and restrict server functions according to the additional information provided or not provided.

In one embodiment where code modules or identifiers are created, the code modules or identifiers may be copied from appliance to appliance, such that, when inserted into a new appliance and used, the identity of the new appliance and the application executing the code is provided to the server, which may vary response accordingly.

In one embodiment, the system further includes an interactive configuration window that may be used by authorized persons to view statistics of usage of services of the system. In one embodiment, authorized persons may view statistical activity and status of individual personae and group personae. In one embodiment having modes of action, an interactive window may comprise a commercial display or brand.

According to another aspect of the invention, a method is provided for sharing information. The method includes the steps (a) creating in a server in a wide-area-network, a persona associated with a first person and stored in a data repository coupled to the server, (b) creating in the server an interactive window deployable to electronic appliances, the interactive window associated with the persona and comprising one or more interactive links for initiating server functions, and (c) creating a rule set associated with the persona and operable on the server, the set of rules defining and limiting the server functions that may be initiated through a deployed interactive window, the rule sets enabling the first person to control identity and contact information made available to users of deployed interactive windows.

In one aspect of the method, deployment of an interactive window is through creation of a code module associated with the interactive window, the code module executable by an electronic appliance to paste second code into a specific application, which second code when executed by the application causes the electronic appliance to establish communication with the server identifying at least the electronic appliance and the application, to retrieve third code and data from the server, which the electronic appliance uses to display the interactive window. In one aspect of the method the interactive window comprises first indicia identifying the personae and at least one link having second indicia identifying a mode of action, the at least one link selectable by a second person using the electronic appliance and viewing the interactive window, to initiate a request for action to the server.

In a variation of the aspect described immediately above, one or both of the identity indicia of the persona and the modes of action displayed by the interactive window may be varied by the server dependent on one or both of the identity of the electronic appliance and the identity of the application. In another variation of this aspect, modes of action include at least one of a request for communication with the first person associated at the server with the persona identified in the interactive window and a request for information associated with the first person. In another variation of the aspect just mentioned, the request for action identifies a mode of communication. In this variant of the aspect, the modes of communication include establishing one of a live voice call, a text messaging channel, a voice mailbox, or an email.

In another variation of the aspect having a mode of communication, indication of presence of a first person for receiving a communication is provided in the interactive window. In one aspect a group persona may be created defining a group of individual personae related by any one or more of activity, family, formal membership, political affiliation, or other relationship. In this aspect modes of action may comprise sending a message to all or selected ones of the persons in a group identified by the group persona or publishing information to all or selected ones of the persons associated by persona in a group identified by the group persona.

In one aspect, the server, in response to an action link being selected by a person viewing an interactive window, may request additional information from the person initiating the action link, and may vary and restrict server functions according to the additional information provided or not provided.

In the aspect using code modules or identifiers, the code modules or identifiers may be copied from appliance to appliance, such that, when inserted into a new appliance and used, the identity of the new appliance and the application executing the code is provided to the server, which may vary response accordingly.

In one aspect, the method includes a step for viewing by authorized persons, statistics of usage of services of the system through an interactive configuration window. In one aspect, authorized persons may view statistical activity and status of individual personae and group personae. In the aspect including the interactive window, the interactive window may comprise a commercial display or brand.

BRIEF DESCRIPTION OF THE DRAWING FIGURES

DETAILED DESCRIPTION

The inventor provides a system for managing interaction and information including a server and distributable server client that may be used to enable communication between users and publishers that use the server client to publish their information the system also used to create and manage virtual social interaction networks where users may publish their information and identities with user-controlled levels of identity protection enforced to protect real contact and identity information of publishers. The details of the invention are explained fully in the following embodiments.

Figure 1:
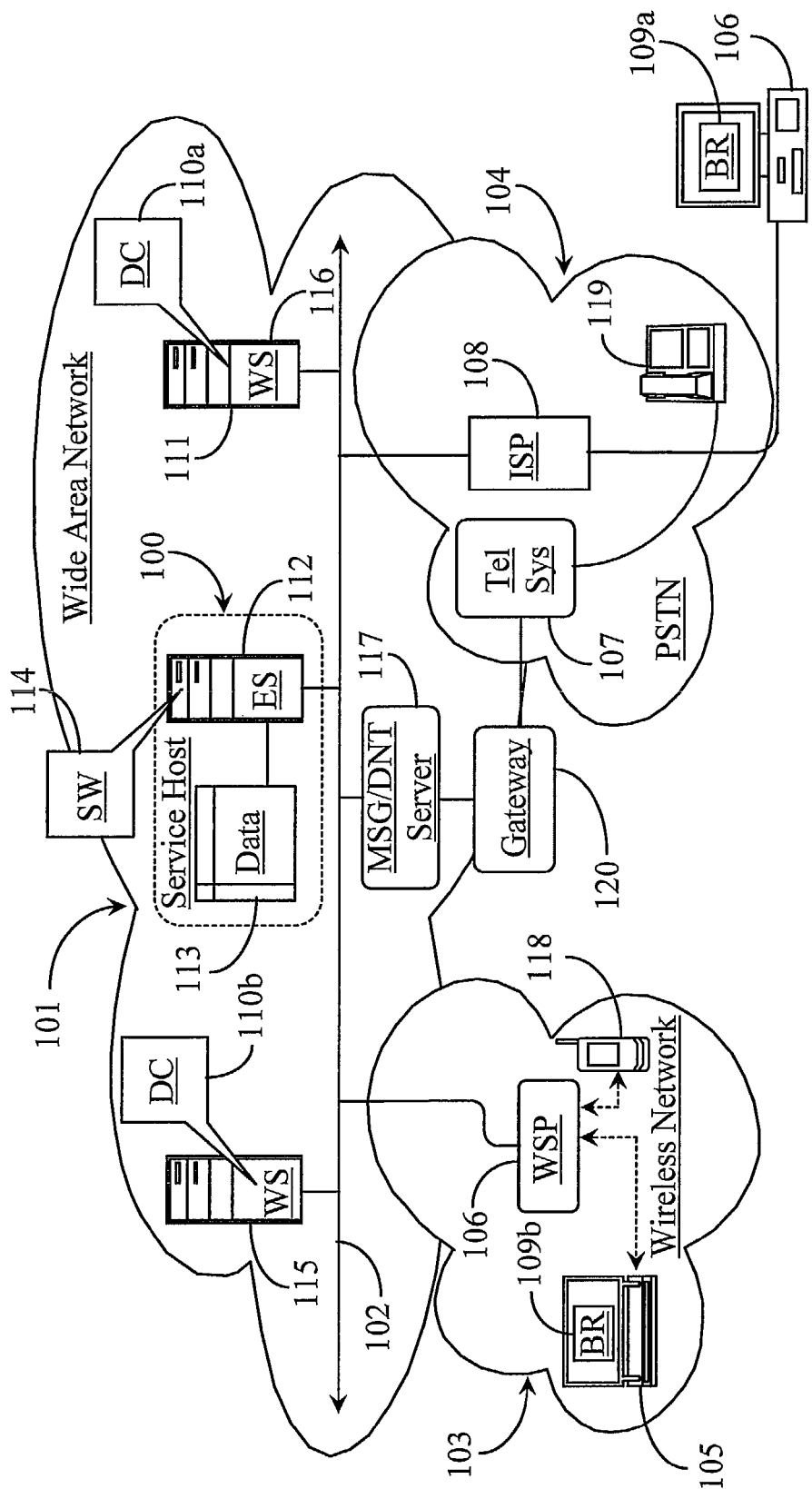
FIG. 1 is a block diagram illustrating a network architecture supporting a server-client system for enabling users to contact a publishing client while protecting the identities of the clients according to an embodiment of the present invention.

FIG. 1 is a block diagram illustrating a network architecture supporting a server-client system for enabling users to contact a publishing client while protecting the identities of the clients according to an embodiment of the present invention. Network architecture capable of supporting practice of the present invention includes a wide area network (WAN) 101. WAN 101 is also referenced herein by a network backbone 102. WAN 101 may be a corporate WAN or a public WAN such as the Internet network.

WAN 101 may be referred to as Internet 101 in embodiments where the Internet is used. WAN 101 is connected to a wireless network 103 and to a telephone network, in this example, a public switched telephone network (PSTN) 104. Wireless network 103 may be a wireless cellular telephone carrier network or a wireless fidelity (WiFi) network or some other type of wireless data network so long as the protocols of WAN 101 are supported including Internet protocols in the case of Internet 101.

PSTN 104 may instead be a private telephone network or a corporate network. In this example, the inventor chooses network 101 (Internet) because of its high public access characteristics of those networks. PSTN 104 and wireless network 103 may also serve a large public base. Therefore, there are no geographic limitations to the practice of the present invention.

Internet 101 includes a service host 100. Service host 100 may be any enterprise hosting the server-client system of the present invention. Service host 100 includes an enterprise server (ES) 112 and a connected data repository 113. ES 112 is enhanced and enabled by enterprise software (SW) 114. Repository 113 may be internal to ES 112 or external as illustrated in this example. Repository 113 may be an optical storage system, a hard disk system, a redundant array of independent disks (RAID), or any other known data repository.

ES 112 is a central server system, which may be hosted on one or more than one machine in a scalable embodiment. ES 112 is enhanced to provide in addition to other services, contact services to users who may wish contact and interact with other users through a unique distributable server client that may be inserted in Web pages or other electronic display media accessible to users. ES 112 offers contact services to clients in a way that protects the client identities from potential abuse. ES 112 also includes a portal for enabling clients to configure their identities and to determine a level of protection for real contact or other identification information from users who may contact them using the service.

Repository 113 is connected directly to ES 112 and is adapted to contain among other data, contact action constraint data configured by clients relative to contact related actions. Other types of data that might be contained in repository 113 may include customer account data, customer primary contact information, various customer aliases or "personae" and associated contact data, rules related to servicing customers and making contact with customers, customer presence information, and other configurable data related to customer service accounts.

Customers of host enterprise 100 may be individuals or groups of individuals including corporate groups of individuals, business-related groups of individuals, socially networked groups of individuals, event-networked groups of individuals, family groups of individuals, or just individuals that have reason to communicate periodically or frequently over the public network with a configurable degree of identity protection.

An identity relates to any identity information or profile that a customer or service client wishes to publish through a distributable client provided by the service. Identity protection relates to protecting the publisher's contact information and other attributes of an "identity" that the publisher wishes to hide from anyone who might make contact with the publisher through the service.

Customers as described immediately above may be subscribers to the service of the present invention. A customer or client may connect to ES 112 for the purpose of opening an account with the service and configuring one or more server clients for use in identity publishing. Such customers may utilize personal, membership, or enterprise specific Web pages that are available to the general public or otherwise to users who may make contact with those customers through those sites. The service of the invention utilizes a distributable server-client adapted to enable customers to publish their identities and other data to any Web page, communication application with Web access, or word processing document with Web integration capability they may have access to.

In this example, a Web server (WS) 115 is illustrated having connection to backbone 102 and a Web server (WS) 116 is illustrated also having connection to network backbone 102. Web servers 115 and 116 may host Web pages accessible to users within which server clients of ES 112 may be inserted in some cases by installing embedding, or pasting. On Web server 115, a distributable client (DC) 110b is illustrated and on Web server 116, a DC 110a is illustrated. DCs 110a and 110b are primarily adapted as distributable access points presented as interactive windows that when invoked by a user function to open a client/server connection to ES 112 provide a gateway to services accessed from the point of distribution. Contact services for example may include telephony contact services, messaging contact service, email contact services, voice mail services, and other contact services. The identity publishing client may select and configure which contact services will be available through any DC interactive window. In one embodiment other published data may be accessible through the DC interactive display window such as links to other data or sites, published article or newsletters and similar published materials.

A network communications routing system 117 is illustrated in this example having connection to network backbone 102 and represents generic electronic message (MSG) router capability such as any email server, for example. Routing system 117 also represents voice communications routing such as data network telephony (DNT) including Voice over Internet Protocol (VoIP) and other voice messaging or bi-directional communication services. CTI telephony services may also be leveraged through routing system 117. In one embodiment, media services may be available through routing requests to deliver support and media content to iPanels for requesting users to access if authorized.

One with skill in the art will recognize that such routing and interaction systems may be proprietary by design and may be hosted by a wide variety of communications service providers and may include such as short message services (SMS), instant message services (IM), chat services, and voice message services, interactive voice response (IVR) services and so on. Routing system 117 and any associated equipment and serviced may be provided entirely by host 100 or may be leased by the host from third-party service providers. The host may also observe a combination of hosting and leasing equipment and capabilities without departing from the spirit and scope of the present invention.

ES 112 has the capability of initiating a contact requested by a user operating through a distributable client like DC 110a or DC 110b. The contact initiated may be a telephone call, an email message, or some other supported form of contact. ES 112 therefore may be assumed to be capable of accessing the required voice or message systems in place within the host or external of the host to enable communications and to effectively cause a contact event to be established between the two parties where the contact requesting party is prevented from seeing certain information of the publishing party.

A desktop computer 106 is illustrated in this example having a telephone line connection to network backbone 102 through an Internet Service Provider (ISP) 108 in PSTN 104. In this example, desktop computer has access to Internet network 101 via telephone modem dial-up method. However, other methods are available and may be used instead such as integrated services digital network (ISDN), digital subscriber line (DSL), cable modem, corporate line, or others. Wireless broadband, wireless cellular, and other wireless technologies may be used with a variety of wireless devices to practice the invention.

Desktop computer 106 is network-capable and may be assumed enabled for network browsing, network telephony, and network messaging using known software programs adapted for the purpose. In this regard, a user operating desktop computer 106 may browse electronic information pages (Web pages) served by Web servers on the network such as Web servers 115 or 116. Other communications devices may be associated with desktop computer 106, such as a PSTN-connected telephone 119, a cellular telephone, and the like. Other equipment illustrated in PSTN 104 include a telephone system switch 107, which may be computer telephony integrated (CTI). In this case, telephone 119 has connection to switch 107, which in turn has connection to a network bridge or gateway 120 for use in transferring telephone calls between PSTN 104 and Internet 101 as is generally known in the art.

Desktop computer 106 has a display monitor with a browser application 109a illustrated. Browser 109a may access Web pages served by Web servers 115 or 116. Therefore, browser 109a may load a Web page served by WS 116, the Web page having DC 110a inserted herein. DC 110a, known as an iPanel may be triggered to display within browser 109a as part of the host Web page. DC 110a may be displayed when the page loads or by a browser order as a result of mouse click or user selection. DC 110a is enabled by code module or identifier that includes the server address of ES 112. When it is activated, server ES 112 is connected to and responds by serving the correct iPanel attributes according to certain constraints. The code may include just a universal resource identifier (URI), an email address, universal identifier (UID), or universal resource locator (URL). The code when activated causes the server to render an iPanel.

DC 110a is dynamically served or built as a result of execution of inserted code of the client at the point of access and the attributes available to (served to) the user may vary according to the distributed location of the server client, presence state of the publisher, the identity of the user (machine address/network address) of the accessing device. The code may be limited such that a same piece of code may be used to represent multiple different DCs owned by a publisher wherein each DC represented is displayed when executed with unique identity and contact attributes. The attributes for filling out the display of the server client are served to the client when it is invoked or "loaded" by ES 112. The build function of ES 112 relative to a distributed client may be governed by reported location of the client (host document location), distributed state (host document type) and, perhaps the accessing device parameters among other things.

DC 110a and DC 110b serve as interactive interfaces containing interactive options for initiating contact with the publisher of the DC. The DC at minimum and only when executed to display includes a role or "persona" (identity) with the publisher, and an optional photo of the persona portrayed by the publisher. Optionally, an action button for requesting customer location (Map) may be provided as well as other custom buttons like a button connecting the user to a biography of the publisher possibly constrained by the role or persona created for the DC location by the customer. Similarly other action icons or buttons that provide additional functions could be provided.

Clicking on an action button may cause a second interactive window to display depending on the type of action the button represents. A second interactive window or contact window includes the appropriate fields for taking the user's contact information required to initiate a contact between the user and publisher. A main feature of the contact service is that some level of identity protection not limited to contact information masking is afforded the publisher such as, for example, hiding the publishers telephone numbers or email address from the user attempting to make contact; blurring a picture or serving one that does not fully identify the publisher; and excluding any location information about the publisher. Location of the contacting user may also be considered in identity protection such as increasing the level of identity protection according location of the user at the time of the request. The user in this case may not receive the full identity of the user he might otherwise be entitled to.

In one embodiment, a publisher may create or configure several distributable clients displayable as interactive windows (iPanels) having different special identities and different contact options and display attributes. These DCs may be placed or moved to desired hosts determined by the publisher who created them by installing the code or copying and pasting the code or identifier into the host. A host of a DC such as DC 110*a* or DC 110*b* may be any Web page, Web integrated desktop application, such as Outlook™ for example, or any Web integrated electronic document such as Microsoft Word™, Power Point™, Adobe™ and others. A host of DC 110*a* may further include any Web-enabled appliance such as a cell phone, personal digital assistant (PDA) or other intelligent devices or services such as GPS Navigator™. Web-enabled media appliances such as Web enabled television, Rhapsody, and a host of media download appliances can server to host DC 110*a*.

As described further above, DC 110*a* or 110*b* (Interactive Window) may contain one or more information action buttons that may be selected by a user to call up and display some information about the publisher that the user wishes to review such as a biography, list of accomplishments, list of credits, qualifications, opinion, political blurb etc. Other information may be displayed in the interactive display window of a distributed client such as a picture of the publisher, and a job title or role (persona) of that publisher associated with that particular window. It is noted herein that different personae of a publisher may be associated with different contact information and different actions or modes for contacting the persona of the customer.

With respect to pictures associated with a role or persona, a single picture or a picture slide show can be served as well as gif animations, avatars or the like. In one embodiment the publisher may have a short video clip that might be invoked by clicking on the lead frame of the clip used as the "picture". It is important to note here that a picture is in some aspects considered an identity parameter of a publisher. Therefore depending on the application, the publisher may wish to be represented by an avatar, a cartoon image, a blurred image, or perhaps no image at all in order to mask the true appearance of the publisher from those who may make contact. Likewise, there may be access constraints applied to created levels of service of any multimedia content that displays in the "picture" placeholder of an iPanel based on a class of service that selectively allows or denies full access to the content.

In one embodiment, the image may be changed when the interactive window is served dependant upon who might be displaying the image if known to the server before any contact attempts are made by a user. If the user is someone I am competing with then perhaps a competitive picture of me will display instead of a smiling me. Server recognition of a user at the stage of execution of the code may not be possible until the user inputs some identification information.

A Laptop computer 105 is illustrated in this example and has a wireless connection to Internet network 101 via a wireless service provider (WSP) 106, which also provides Internet connection services. In this case, wireless network 103 is a digital wireless network. As described with respect to computer 106, Laptop 105 may be adapted for Internet browsing, network messaging, and network telephony. Similarly, there may be other communications devices associated with Laptop 105 in a physical domain sense like a cellular mobile telephone 118, a personal digital assistant, other wireless communications devices, or a landline telephone connected through the PSTN.

A user operating Laptop computer 105 may connect to a Web server such as WS 115 and be served a Web page containing DC 110*b* execution code. In one embodiment, a user (one who wishes to contact a publisher), clicks on a link such as a contact link including the execution code (110*b*) inserted in the Web page to cause service of DC 110*b* to display locally. Different personae of one publisher may be created for use in different environments. For example, a publisher may have a persona for a sales job and a persona for a bowling league. Multiple distributable clients of one publisher may not necessarily be all accessible from one single Web page unless that page was also created specifically to provide those different personae (published identities) for interaction.

In practice, when DC code 110*b* is executed by a user such as one operating Laptop 105 and browser 109*b*, it causes a server/client connection to be established between WS 115 and ES 112 aided by SW 114. In one embodiment, the actual data required to "build" the interactive display of DC 110*b* is aggregated by ES 112 according to configured rules and preferences and is served to WS 115 as loadable data, which subsequently displays as an interactive client on Laptop 105 within browser 109*b*. In this way there is a dynamic component to the distributed client and there may be information and options added to or taken from the interactive window as prescribed by the publisher or agent for the publisher.

In one embodiment of the present invention, Dynamic Hypertext Markup Language (DHTML) and Cascading Style Sheet (CSS) scripting is used to enable dynamic service of the interactive windows and for defining how those windows will appear once executed. In practice of the invention after DC 110*b* is executed and displayed, a user operating Laptop 105 or desktop 106, for that matter may select from presented contact action options to initiate and hopefully establish a contact event with a publisher. Invocation of one of the presented options causes submission of a request over the established client/server channel for initiating contact with that publisher using the selected "mode" of communication. In this regard, the contact information of the publisher relative to the action selected may be withheld from view of the user so that the publishers contact information is protected cannot be obtained for illicit purposes and security is maintained.

It is noted herein that a pre-defined trigger that causes automatic display and service of the publisher identity and contact options may execute a DC code. The trigger may be the event of a Web page being accessed by a device of a user. The trigger may be the invocation of a link or graphic on a Web page already displayed on a user device. In one embodiment, a trigger for executing DC code may be time constrained, such as for example, execute code after the user is on the site for more than one minute. Many different implementations for code execution, which may entail simply the activation of an identifier may be practiced.

As illustrated with respect to the architecture, a user operating desktop 106, for example, may "load" a Web page containing several DCs that may all be built and served locally for the user according to a same trigger event. An example would be a contact page for a group of publishers connected in some fashion such as business or through a social group or a family group. Because an active client/server connection is activated during display of a DC, presence information relative to the publisher or publishers may be served into the appropriate DC displays. Contact options may in one embodiment be dynamically served according to time based and presence based rules. In one embodiment, a family iGroup may be an extended family that may include all relatives distant and immediate. Likewise, two or more family groups can merge to form an extended family group such as a group aligned through marriages the group including multiple family surnames.

In general, when a user selects a presented contact option from a DC such as clients 110*a* or 110*b*, a second window relative to the contact mode selected appears containing fields for the user to input identity and contact information for contact initiation. For example, for a telephone call request, the user would enter a telephone number to call. For an email communication, the user would enter an email address and type in the message in a field adapted for the purpose. The submission of the request may be directed to ES 112 for pending action according to pre-configured constraints for that DC (persona) and contact mode. ES 112 initiates the contact between the user and the publisher and protects the publisher's contact data by preventing visibility of that information by the user. Therefore, on a telephone contact, for example, the publisher's telephone number would not be visible to the user. In an email, the publishers email address would not be visible to the user.

Figure 2:
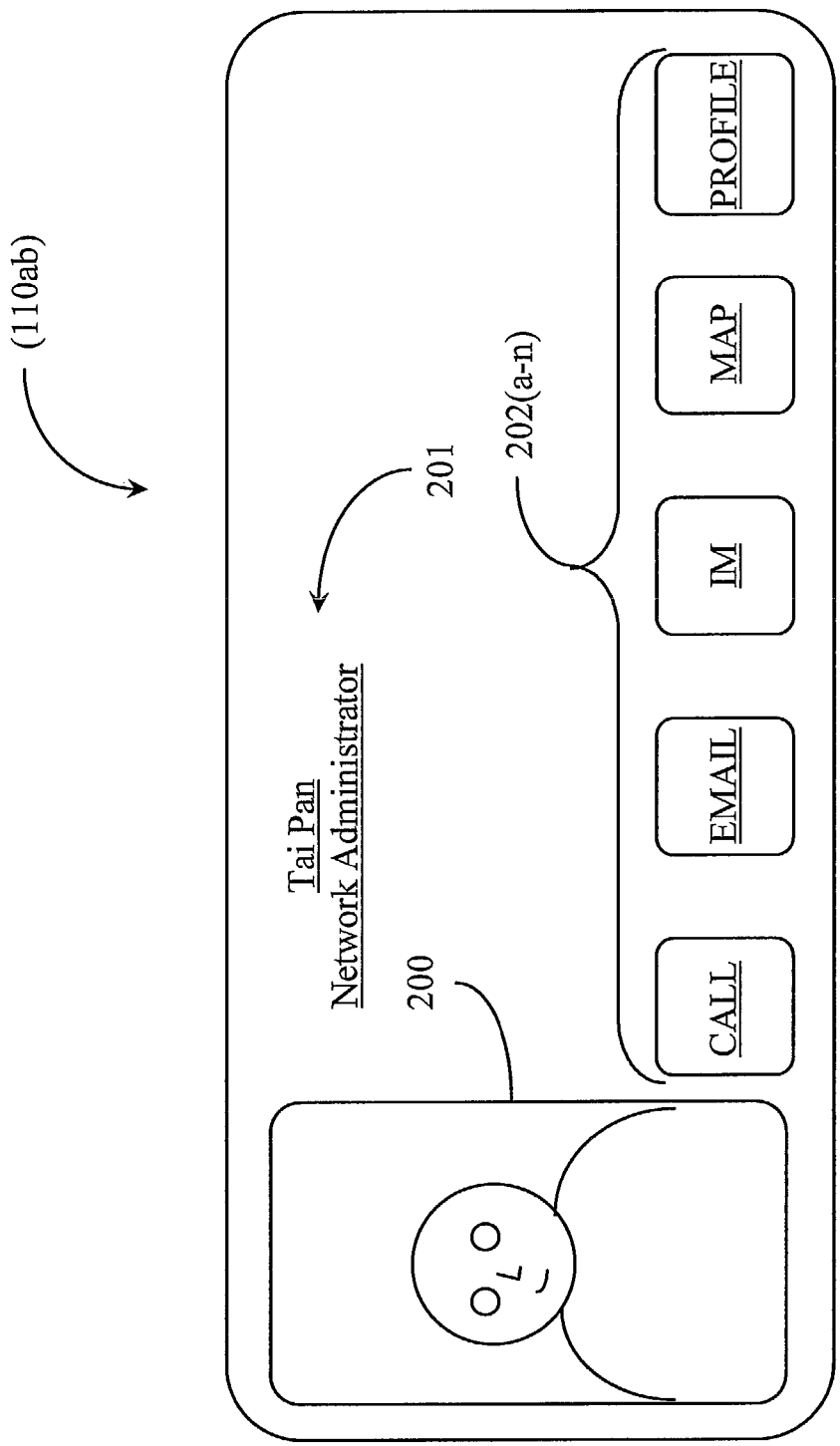
FIG. 2 is a block diagram of an exemplary interactive window display of a distributable client according to an embodiment of the present invention.

FIG. 2 is a block diagram of an exemplary interactive window display of a distributable client according to an embodiment of the present invention. Distributable client interactive window 110*a* or 110*b* may be displayed on a user's computing display screen whenever invoked as a result of selecting (clicking) a contact URL presented in a Web page, form, or document integrated for HTML modality. A trigger event such as Web page loading or opening of any Web-integrated document may also cause display of DC 110*a* or DC 110*b*.

In this example the element 110 will be used to describe the distributable client since instances 110*a* and 110*b* described in FIG. 1 are essentially the same client in terms of base code. The term interactive window may be used in this example to identify the displayed state of DC 110. It is noted herein that the server client display or interactive window is dynamically built and served when the client base code is executed and the nature of the display may be highly varied according to circumstance.

The displayed interactive window of DC 110 may include a publisher name field for displaying a name representing the publisher and publisher role or persona field 201 for displaying the role or persona created by the publisher. In this case the name of the publisher is Tai Pan and the persona or role that Tai Pan is portraying through DC 110 is that of a network administrator. This identity information is sufficient to identify the interactive window and to associate the client with the correct options and contact information relative to that client identity information.

This is just one of more than one possible persona that may exist for the publisher named Tai Pan. The persona or role "network administrator" will identify DC 110 and associate the identity to the interactive window display and specific contact information provided by or created for the publisher that may be active contact data for that particular persona. In one embodiment, the publisher name portion of the field may also include a relationship statement although one is not illustrated here. For example, Tai Pan, father of Shri Pan.

The appropriateness of a relationship statement may be based partially on the selected persona of the interactive window and whether the persona is part of a group of publishers. A group of users may organize under a group name and may collectively be represented by a distributable client that represents the entire group of users organized as an iGroup. In this case, each publisher/member of the group may also have one or more DCs that may be nested in the parent DC or group DC. In one case, the group DC becomes an access point for browsing group members and initiating contact with group members through their own DCs.

In this embodiment, the interactive window of DC 110 includes a thumbnail picture or inserted picture 200 of Tai Pan. Picture 200 may be a thumbnail picture that is not interactive or it may be a dynamically served picture that may be clicked on to enlarge. In one embodiment, a likeness of Tai Pan may not be included. Likewise, the picture 200 if provided is not required to be of the likeness of the contact per se. The picture may be selected for display by the publisher and therefore could be of any description. Likewise, more than one picture may be provided to be dynamically served to DC 110 for display in the interactive window each picture displayed for a time then replaced by a next picture like a slide show. Instead of a picture, text information, audio, audio/video, or cartoon animations may be also be served and displayed.

Interactive window 110 includes a plurality of interactive and selectable links presented in the graphic form of action buttons 202 (*a-n*). From left to right, the action buttons are a call button 202*a*, an email button 202*b*, an IM button 202*c*, a map button 202*d* and a profile button 202*n*. There may be more or fewer action buttons of like or other descriptions provided on the interactive window of DC 110 without departing from the spirit and scope of the present invention.

It is possible in one embodiment that the executable code of a distributable client may contain instructions for serving one or another interactive window and associated interactive features base on a conditional state reported to ES 112 at the time of code execution. For example, the resulting interactive window might identify one persona and associated options of the publisher for users who execute the client from a Laptop computer while a completely different persona and associated options might be served if a cell phone executes the code. Hence the separation in definition from the distributable client, which is the executable code and any execution conditions in the code, and the interactive window that displays as a result of the execution of the code.

Referring now back to FIG. 2, call button 202*a* may be interacted with by a user viewing an interactive window of DC 110 in order to initiate contact with Tai Pan by telephony application, including by a shared or dedicated line as the case may be. Clicking on call button 202*a* results in a subsequent display on the user's computing display screen of a second interactive window that may be interacted with to execute a telephony request relative to Tai Pan, network administrator. Email contact button 202*b* may be interacted with by a user in order to display a second window enabling the user to send the customer an email message. IM button 202*c* may be interacted with by a user in order to display a second window enabling the customer to send an instant message to the contact. Map button 202*d* may be interacted with by a user in order to display a second window that enables the user to retrieve a map of the customer location and/or directions to the customer location from a user perspective. Profile action button 202*n* may be interacted with by a user in order to retrieve a second window containing some information about Tai Pan such as a short biography, a history with the current position, or some other relevant profile data that Tai Pan has authorized for distribution.

Execution of DC 110 may result in display of an interactive window that may be pre-configured to be displayed in different ways. This view represents a standard layout with picture 200 on the side and the array of action buttons 202(a-n) laid out horizontally across the bottom of the window. In another layout, picture 200 may be much larger and the action panels may be laid out vertically, or in a staggered sequence array. In another possible layout, the picture may be centered with the action buttons surrounding the picture borders. In some cases, the icons may be brand logos in the case of branded iGroups for example, which will be described in more detail later in this specification. There are many possible variations in presentation. It is important to note herein that the presence of real identity information about the publisher of DC 110 or Tai Pan depends entirely on the preferences of Tai Pan.

It is noted herein that some of the displayed features of an interactive window of DC 110 may change depending on where the client is executed, for example, if DC 110 is executed from a Laptop computer, a higher resolution Jpeg may be served as picture 200 in the interactive window whereas if the DC is executed by a cell phone, a lower resolution might be used. Likewise the machine the display is served to might influence whether video or a still representation of the publisher is used.

In one embodiment of the invention interactive window 110 may be displayed as a simple interactive thumbnail without contact options along with others nested within a DC client configured for a group of individuals comprising some social or business network of individuals. In this regard, there may be options in a group panel or window for making general contact, such as to a group administrator. In one embodiment, nesting individual iPanels within the group panel is practiced, the nested panels represented by interactive thumbnails, perhaps showing only the picture and persona or role of each group member, may represent each of the group members. In this case, a user might browse the group members and click on one to execute the nested code causing an interactive window with contact options to be displayed for that group member.

Figure 3:
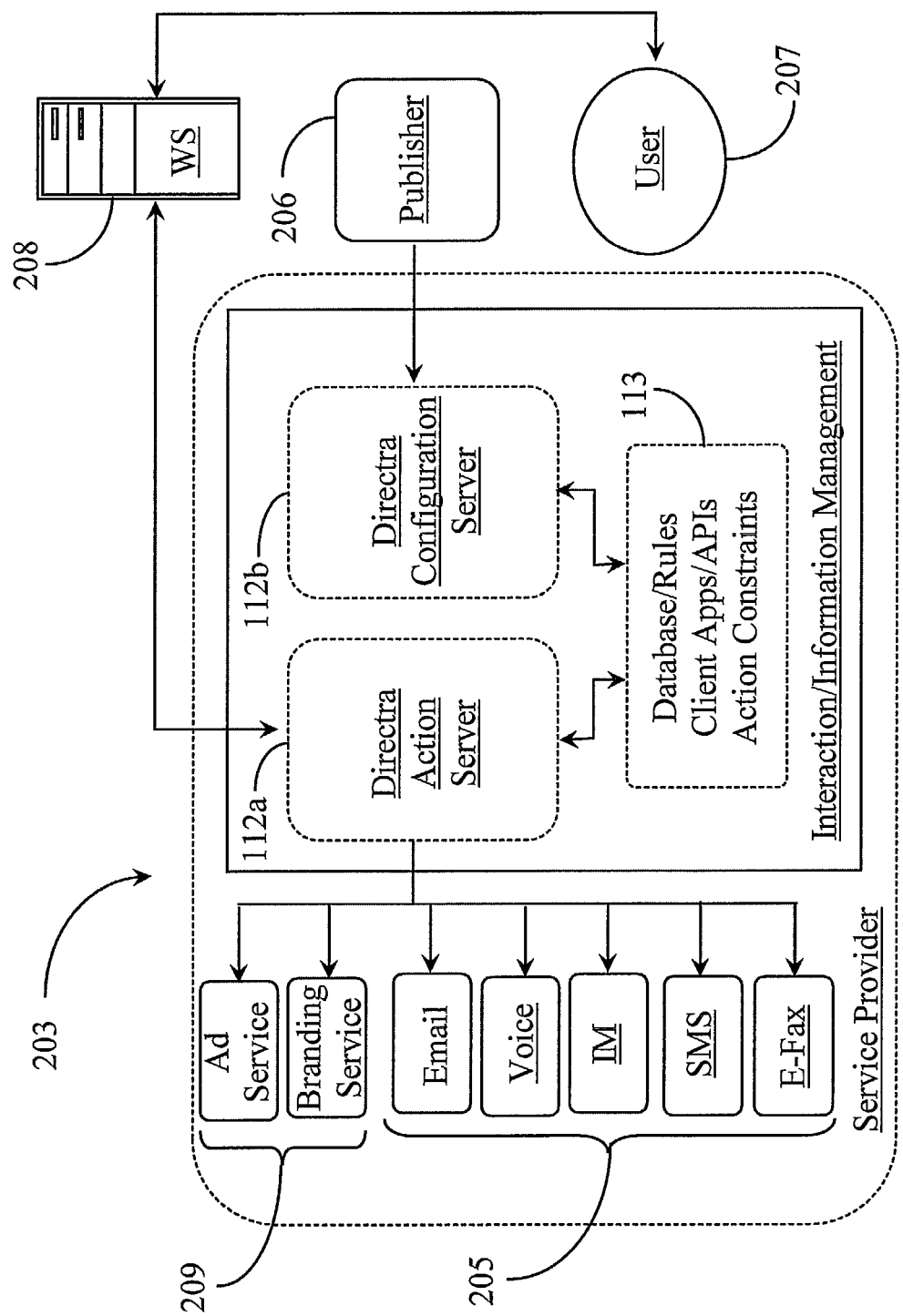
FIG. 3 is a block diagram illustrating a service provider 203 adapted for providing contact services to users interacting with the iPanel of the present invention.

FIG. 3 is a block diagram illustrating a service provider 203 adapted for providing contact services to users interacting with the iPanel of the present invention. Service provider 203 is illustrated in this example. Service provider 203 is analogous to service host 100 of FIG. 1. In this example, a user 207 operating a computing device is connected to a Web server (WS) 208 and is assumed to have executed a distributed client pasted into or inserted into a Web page served to the user from server 208.

A publisher 206 operating from a computing device has access to a configuration component or "dashboard interface" provided by server component 112b termed a Directra configuration server. Sever component 112b may be assumed to be part of ES server 112 functionality described with respect to FIG. 1. Publisher 206 may connect to server component 112b and may retrieve a dashboard style configuration interface for use in configuring one or more iPanels (distributable clients) for distribution to host locations such as in WS 208. All of the pre-configured attributes associated with a DC are stored for the publisher in database 113. The database may be segregated for convenience by publishing individual or publishing group.

The dashboard interface may also server as a one stop interaction management interface for publishers managing interactions relative to multiple personae represented by multiple distributable clients. For example, each persona may have its own segregated interaction space including voice queues, email queues, and other event notification queues. Moreover, message or event interaction priority rules may be separately configurable for each interface, for example, to prioritize call backs, emails, and so on. Priorities may also be set by action constraints based on identities. For example, voice message responses to an outbound contact campaign can be re-ordered in queue depending on identity-linked priority constraint.

In a further embodiment, content analysis may also be practiced to establish interaction priorities for each different iPanel where interaction has occurred. Priorities may be configured differently for a same iPanel deployed to multiple different sites where the priority may be linked to where the sites were deployed to. For example, a publisher may wish to interact with users from the eBay™ iPanel before working responses from the MySpace™ panel of a same persona.

Database 113 may include rules, application program interfaces (APIs) to client applications, and action constraints based on dynamic or pre-configured rules. Publisher 206 may log into server component 112b using, for example, an email address for user name, and a personal identification (PIN) code or password for authentication if required by the server. Client applications may be leveraged for information through APIs provided by the service to interface with those publisher applications. For example, an API may be provided for a user to submit or upload white list or blacklist data associated with a desktop communications application such as Outlook™. Such lists may be made a part of the criteria for adjusting identity protection levels of an iPanel and of course for consulting during interaction management.

All of the input a publisher provides and associates with a distributable client may be stored within data repository 113 and later retrieved during progress of fulfilling contact services. If the user executes the DC within WS 208, then the server client first opens a communications channel between itself on Web server 208 and a Directra action server component 112a. Directra action server component 112a only comes into play when an action has been requested. Firstly an action of loading a Web page or clicking a provided action link may cause a machine-readable code (DC) to execute and open a connection between the WS and server component 112a. The DC code executed includes a URL to server component 112a. The code may include a reporting mechanism that once executed will monitor and obtain specific information such as where the code has been executed from and what device was used to execute the code. Any state reporting by the code can be accomplished once the code is executed.

Once the code has been executed and the server component 112a is connected to, the interactive window of the executed DC code may be built. Action server component 112b retrieves appropriate data from repository 113 for service to WS 208 to build the interactive window for the executed client. Action server component 112a knows the server address and URL of the host page when the server/client connection is established. Server component 112a may also get some information when the server connection is requested such as the reported location of the client code, the identification of the client platform and the identification of the machine causing the code execution as is known by WS 208 when the code is executed.

In one embodiment, the client code may be created and deployed to an electronic appliance having network connection capability such as a cellular telephone or the like. The code may be sent to the appliance as an email attachment or downloaded by the appliance from a server. In this embodiment, one the client code is executed, a second code is pasted into an application running on the electronic appliance such as an address book, for example. When the address book is opened on the electronic appliance, the second code executes and opens a server connection with the action server if the appliance is online. The second code executed reports to the server in the request at least the appliance identification, and the application identification that executed the code. A third code and data is then retrieved from the server which when received is used to display the interactive window (iPanel). In this embodiment, once the server connection is opened, the data for displaying the interactive window may vary relative to personae and modes of action options presented in the display according to any constraint relative to device type, application type and so on.

The information gleaned at the request from the executed client in WS 208 to establish a server connection between it and server component 112a may have some bearing on how the resulting interactive window will be displayed and what features will be included in the window. In this respect, the publisher has additional control over how much identity will be revealed, what options will be provided, and how the display will appear to the user. Some of this consideration may be based simply on mechanics related to device and platform and may be default configuration options. However, a publisher may create rules that specify build operations based on location of the distributed client.

The distributable client may be in a location that the publisher has not authorized and therefore may create a rule limiting response to a connection request from the client. On the other hand, a publisher may have reason to hope that a distributable client will be freely distributed by users, perhaps copied and pasted into multiple Web pages increasing the prospects of interaction requests from multiple users.

Server component 112a accesses database 113 based on a received request and uses information in the request and pre-configuration rules in database 113 to determine the build instructions for serving the interactive window data for subsequent display of the interactive window termed the iPanel that will be visible and accessible to user 207, for example.

Once the iPanel is displayed on the user device, the user may interact with the various features and options provided in the display such as the contact buttons described further above. User 207 may select a contact button to initiate a second request to server component 112a to initiate a contact event to the publisher on behalf of the user. For the duration of the display of the interactive window served subsequent to execution of the client code, the server connection between the client running on the host in WS 208 and server component 112a remains open. In one embodiment, a user requesting contact with a publisher through an iPanel may be asked to provide some additional information or authentication before a request is accepted.

Assuming user 207 is interacting with the first interaction window, and the user selects a call option presented in the window, server component 112a receives the request initiated by the invocation of the call button to place a call to the publisher on behalf of the user. Upon receiving the request, server component 112a serves a second interactive window containing the appropriate fields for the user to enter identity information and a telephone number to call. In one embodiment, the secondary windows are served initially with the interactive window but do not display until invoked.

User 207 enters the information and submits the information as a request to contact the publisher by telephone. The user does not see any telephone number for the publisher and can only place a call to the publisher through the interactive window call option with the server connection open between the server client and the server. The publisher's real phone number is known only to the service of the invention and is never published.

Server 112a receives the submitted request information including the user telephone number and identity. Before any action is taken, the server may check database 113 for any constraints in place for the call action or action constraints. In one case, the telephone number given by the user may be on a black list of telephone numbers maintained by the publisher and available within database 113. In another case, the publisher may have presence information indicating that the publisher is online but away at the moment. Such presence indicators may also be served with the first interactive window containing the contact options. In any case where information in database 113 indicates that a telephone call cannot be made to the publisher, server 112a may send a response back to the server client visible to the user that the telephone request was denied.

In a case that there are no restrictions governing the request, server 112a formats an outbound telephone contact request and forwards that request to a telephony server capable of dialing a call to the number provided by the user. Services 205 illustrate contact services available to server 112a and they include a voice service for telephony. Voice services may be leased or owned and may include interactive voice response (IVR), automated number dialing services, and even local switch services. Voice services may include VoIP services and voice messaging and recording services.

In this case, voice services 205 places a telephone call to the number submitted in the request. When user 207 answers, a second call is placed to the publisher transparently of the user. The user never has access to the telephone number of the publisher. If the publisher answers, an automated voice attendant may announce the user name and ask if the publisher would like to take the call. If the publisher takes the call, the two parties are connected in a telephone session. The number of the publisher is never accessible during the telephone session because both parties were called first and then connected at a switch. If the publisher cannot or will not accept the call then an automated attendant will notify the user of the situation and, perhaps ask the user to leave a voice message for the publisher. During the time that a user is on the telephone with the service waiting for connection to the publisher, the service may play one or more advertisements to the user. Such ads may be served by a third party or provided by the publisher or the service depending on the nature of the publisher relationship with the service.

Server function is governed essentially by a request and by any rules or constraints that might be associated to the request type for the publisher persona represented in the first interactive window. If user 207 clicks on an Email action button then a request is sent to server 112a for sending an email to the publisher on behalf of the user. Again, a second window containing the appropriate message fields may be sent back to the client made to display for the user to input the user identity information including the return email address. In one case, the second window associated with the email option may have already been sent to the server client but may not display unless the appropriate email icon is invoked.

Again, the contact information of the publisher, namely the publisher email address is not visible to the user submitting email identity information and typing an email message into the email interface. User 207 may hit send or submit after typing the email message and server 112a will receive the message. Before any action is taken however, the server will check database 113 for any email constraints such as a Spam list, a blacklist or a trust network list and may deny the request if a constraint is in place against the user. If server 112a approves the request, the email message is forwarded to an email service 205 that handles routing of the message to an email address of the publisher based on identity association.

For example, a group of individuals that have different email addresses may have one email account and one email address set up for routing purposes when a user selects an email action button from an interactive window identifying one of those individuals, the email message will be routed to the individual or publisher that owns that persona. If the publisher is an individual, he or she may share a generic service email address with other individuals and routing to actual destination email addresses is based on associating the persona with the publishers actual email address on file. The email address is never published or at any time available to the user. Return emails may be sent to the user email address with the persona name and from address showing the generic email address used by the service or no address at all. Email addresses may also be temporarily assigned to a publisher for a limited period of time specified by the publisher. Other services such as E-fax, IM and SMS can be handled in much the same way by the service so that the real addresses, handles, fax numbers, etc. are never published in a way that the user may access them.

One aspect of the trust routing concept is that if the publisher trusts certain users they may be given preferential treatment by the service over non-trusted or unknown users. This may be managed for each contact option through provision of trusted identity lists that may include names and address information for each mode of contact. For example, if user 207 is an associate of a publisher and requests a call, but the publisher is away at the time, the publisher may authorize use of a personal number such as a mobile telephone that the publisher carries with him. The automated attendant in this case can call the publisher at that number only if the publisher has authorized it for the calling user. In this case, the number may still be withheld from the trusted user only because the publisher may not want to set a precedent for using the mobile number. There are many possibilities.

Service provider 203 may have access to services 209 including one or more ad services and one or more branding services. Ad service 209 can be any third party service that is capable of delivering dynamic or static advertising to server component 112a for inclusion into interactive windows served upon server client code execution by a user. Ads may be served at any time during the open connection between the server and the server client. Branding service 209 may be any third-party service that has authorization to create skins that advertise certain consumer or commercial brands where publishers may select one or more brands for display to users. For example, a soccer coach persona of a publisher may select an Umbro™ brand known in the soccer community as a maker of high quality soccer gear. If the publisher is also the administrator of a soccer group, the brand can be propagated to all of the iPanels created for the group members that might include players and other team supporters.

It is noted herein that the above branding concept provides a non-traditional vehicle for companies providing products and services under a brand to propagate the brand through iGroups in a way that is markedly different than the way traditional electronic advertisement is practiced. For example, if a soccer team buys cleats and soccer bags from the company, its brand may be propagated by a unique skin to all of the iPanels of the team (iGroup customer) and is therefore made visible to all of the contact users interacting with that group including in interaction between the group and other groups.

Branded iGroups may include links that are propagated among the member panels to product and service information, links to special discounts or online coupons for brand members, links to company product pages and catalogs, and so on. An iGroup may become a branded iGroup through a sponsorship arrangement, a position that competing brands might vie for depending on the dynamics, including success, of the particular iGroup. Branding may also be made available for single iPanel publishers as well.

In one embodiment, a publisher may publish a list of favorite brands or vendors available through the profile action button on the iPanel or some other created action button linking to the material. In some cases, a publisher may receive some reward from a company for effectively marketing a particular brand.

In one embodiment, published materials may include routing information or knowledge based on a personal trust network of the publisher, so trust metrics can be published to second parties through the iPanel as a Trust Agent.

Figure 4:
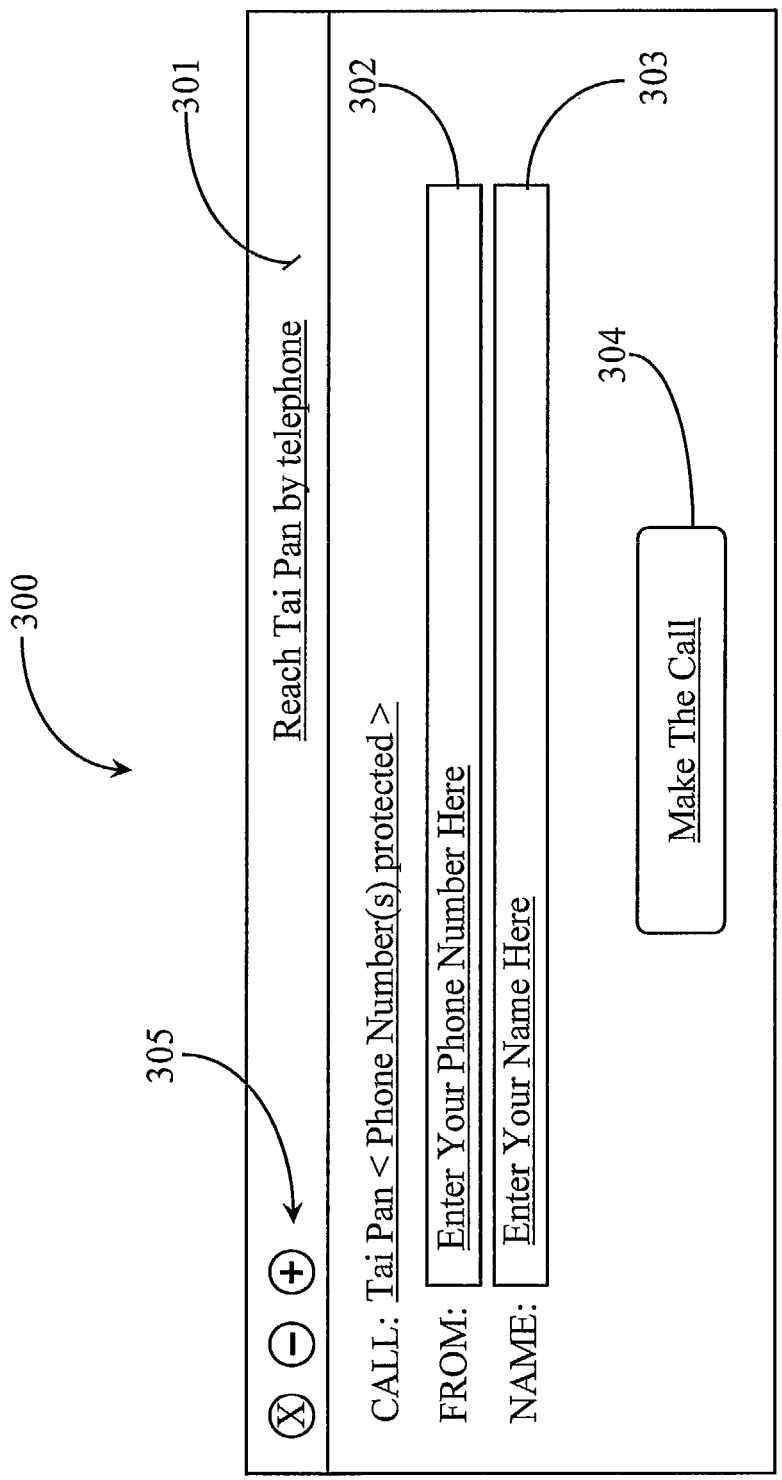
FIG. 4 is a block diagram illustrating an interactive second window 300 invoked by interacting with a telephone call button of the interactive window display of FIG. 2.

FIG. 4 is a block diagram illustrating an interactive second window 300 invoked by interacting with a telephone call button of the interactive window display of FIG. 2. Window 300 is a secondary window displayed as a result of interacting with a call link such as call action button 202a of FIG. 2. Window 300 is served to the user for the purpose of enabling the user to enter the required information to initiate a telephone connection with the contact. As described above with respect to FIG. 3, window 300 may be served with the original interactive window resulting from server client code execution but may not display unless the user invokes it. Otherwise, it may be served over the open connection if the user invokes the telephone call option in the original window and will display immediately upon service.

Secondary interactive window 300 has an information bar 301 indicating that the user may reach the contact by telephone. Bar 301 includes interactive options 305 for closing the window (X), minimizing the window (−) and for restoring the window (+). On the interactive face of window 300 there is an indication that the user may call Tai Pan and informs the user that the telephone number or numbers for Tai Pan are protected meaning that the user will not have access to a number for the persona Tai Pan.

A from field 302 is provided on the face of window 300 adapted to accept an entered telephone number from the user. This number is preferably a number for a telephone available to the user at the time of the call. A name field 303 is provided on the face of window 300 adapted to accept a name or identification of the user attempting to reach the contact by phone. An interactive action button 304 labeled, in this example, "Make the call" is provided so that the user may execute a call request to a server address other than any address of the contact.

In use, a server such as server component 112a described above receives the request for a telephone call, the server having dial out capability or access to a voice server with the capability for placing a telephone call to the user's entered telephone number. The server, analogous to ES server 112 sets up the telephone channel between the user and the publisher by first calling the user at the number entered into field 302. When the user answers, the server then dials a telephone number for the publisher transparently to the user.

When the contact answers, the server using IVR or bi-directional voice interaction capability states the callers name and asks if the publisher will accept the call. If the publisher says yes, then the two legs of the telephone channel are connected and the user and contact may begin conversing over the telephone channel. During the connection the number identification of the publisher is never exposed to the user.

In one embodiment, constraints may apply to the call action executed for a specific contact persona. For example, the server receiving the request for a call from a user may first consult any action constraints or rules that may have been created for the action "call". The user telephone number may be on a trusted user list or a black list. There may be a time constraint for placing a call to that persona. If the user attempts a call that, due to some constraint cannot be completed, the server that processed the request may respond by asking the user via messaging, through the original window, by pop-up indication, or through IVR or automated attendant if the first leg of the call channel is established for input. Such a message or voice prompt may provide notice, for example, that "The person you are trying to reach is available only by email at this time".

In one case, presence information may indicate that the contact is currently working under another persona associated with specific contact information that may be different from the contact information and options provided under the persona the user has executed and is attempting to contact. In this case, the interactive window of the first persona may be dynamically substituted by the interactive window of the second persona or to the persona known to be indicative of the current state and availability of the publisher. Dynamically substituting interactive windows for a single location may require an overriding rule in place for triggering a substitution and similar or same base code for the server client to accept the substituted window. In one case, the publisher may be working under a persona correctly served to the user via interactive window, but may be temporarily unavailable because of engagement with a user in one or more of the communications modes represented by the action buttons. More than one user may execute the code causing multiple displays of the same interactive window.

In a case of unavailability of the publisher for any reason such as due to a pre-planned action constraint or for other reasons such as away state, network conditions, etc., if the contact request cannot be fulfilled, the user may receive notification back through the network connection between the client and the server to the local display window the user has open or via a separate pop-up message window. In the case of a telephone request if the user is already connected but the publisher cannot or will not accept the call, IVR intervention or an automated attendant may be implemented to inform the user of the condition or state and may make one or more suggestions to the user such as "Try your call again later"; "Would you like to chat with the contact"; or perhaps, "Contact is currently unavailable at this channel would you like to switch channels". It is noted herein that full telephony modality may be leveraged in this example, such as the ability for call waiting, call hold, call forwarding, 3-way calling, and the like. It is noted herein that secondary interactive messaging or call windows may also be carriers of advertising and branding.

Figure 5:
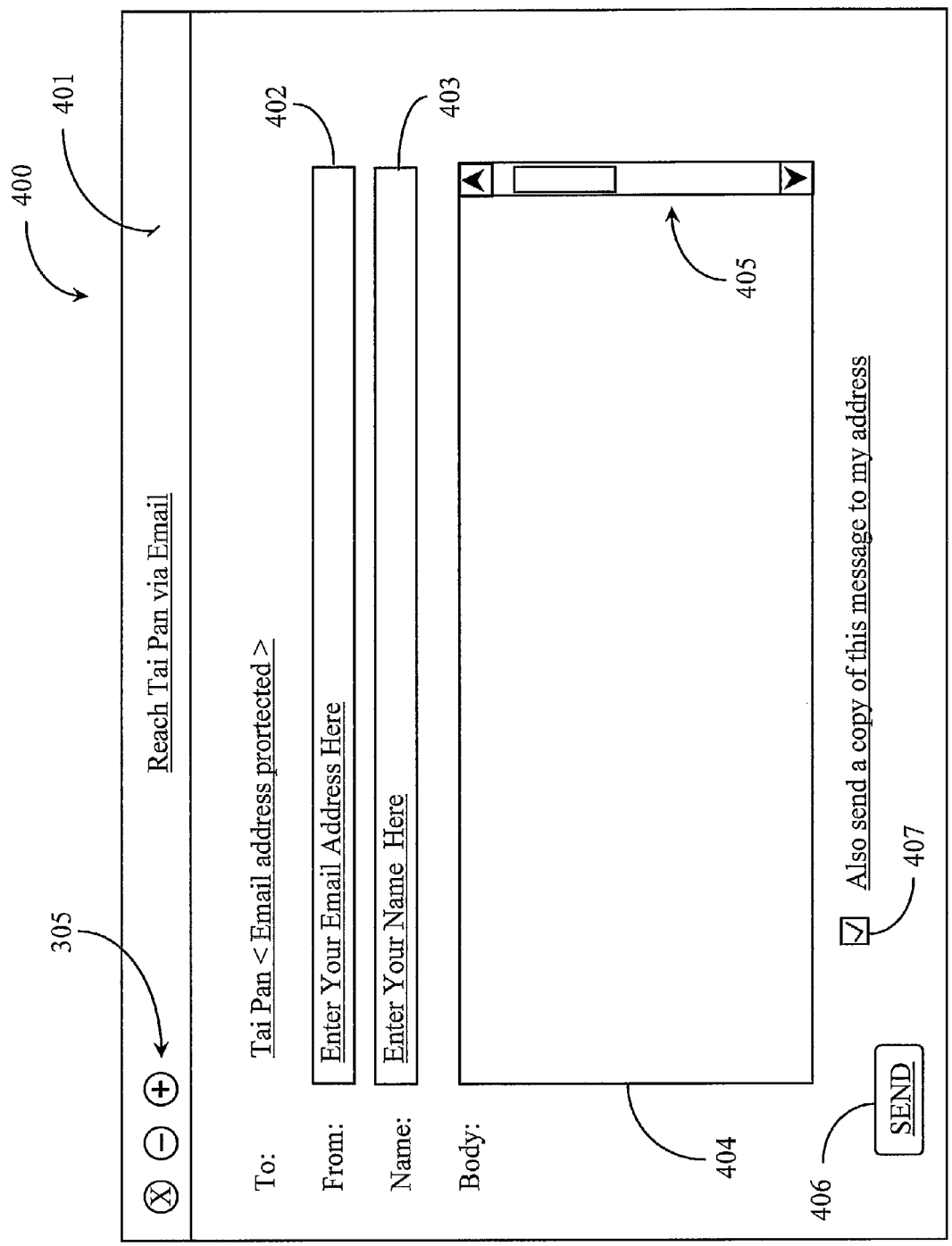
FIG. 5 is a block diagram illustrating an interactive second window 400 invoked by interacting with a text message link or email action button of the interactive window of FIG. 2.

FIG. 5 is a block diagram illustrating an interactive second window 400 invoked by interacting with a text message link or email action button of the interactive window of FIG. 2. According to an embodiment of the same invention, window 400 is served to the user upon selecting the email action button 202b of the interactive window DC 110 illustrated and described above.

Window 400 is similar in appearance to an email interface and is adapted to allow the user to send a message that will be received at a server such as server component 112a described above and then routed as an email message to one or more email addresses of the publisher. Publishers may download their email from an IMAP server or may have email forwarded to their post office protocol (POP) email account or accounts. The server analogous to server component 112a of FIG. 3 functions as a proxy messaging server by sending a formatted message to, for example, a message router or email routing service that will route the message by identity matching the publisher persona to an actual messaging address known to the server but not made available to a user.

Window 400 has a title bar 401 that reads Reach Tai Pan via email. Interactive options 305 are also present for closing minimizing or restoring the window as described further above. The face of window 400 includes a To: line indicating that the user is emailing Tai Pan. A notification to the user indicates that indicates that the email address of Tai Pan is protected. This means that the email address that will be the destination address of the message will not be revealed to the user.

The face of window 400 includes a from (From:) field 402 adapted to accept input of an email address of the user. A name (Name:) field 403 is included on the face of window 400 for the user to input a name. A message body (Body:) field 404 is provided on the face of window 400 for the user to input the message. Message body field 404 is scrollable using scroll bar 405. The interface includes a message send button 406. A check box 407 is provided for enabling the user to forward a copy of the message to an email address of the user, which would be the same address entered into the from field. In one embodiment, window 400 might also include a mechanism for enabling a user to send attachments though none is illustrated here.

In one embodiment, the host maintains an email routing server that accepts the message body from the user addressed to a generic email address, which is not the publishers address and then routes that message according to constraints pre-configured by the publisher as an email message to the publishers email address.

The address of the user may be on a publisher's black list or trusted user list. A publisher may maintain a temporary email address where certain mail is screened for routing to a more permanent address. The contact may have forwarding orders to specific email addresses for certain mail sent to the address used by the service message router as the email contact for the specific persona of the contact the user is attempting to reach. Another persona set up by the contact may have another email address associated with the email action button if one is provided in the interactive window representing that persona.

Figure 6:
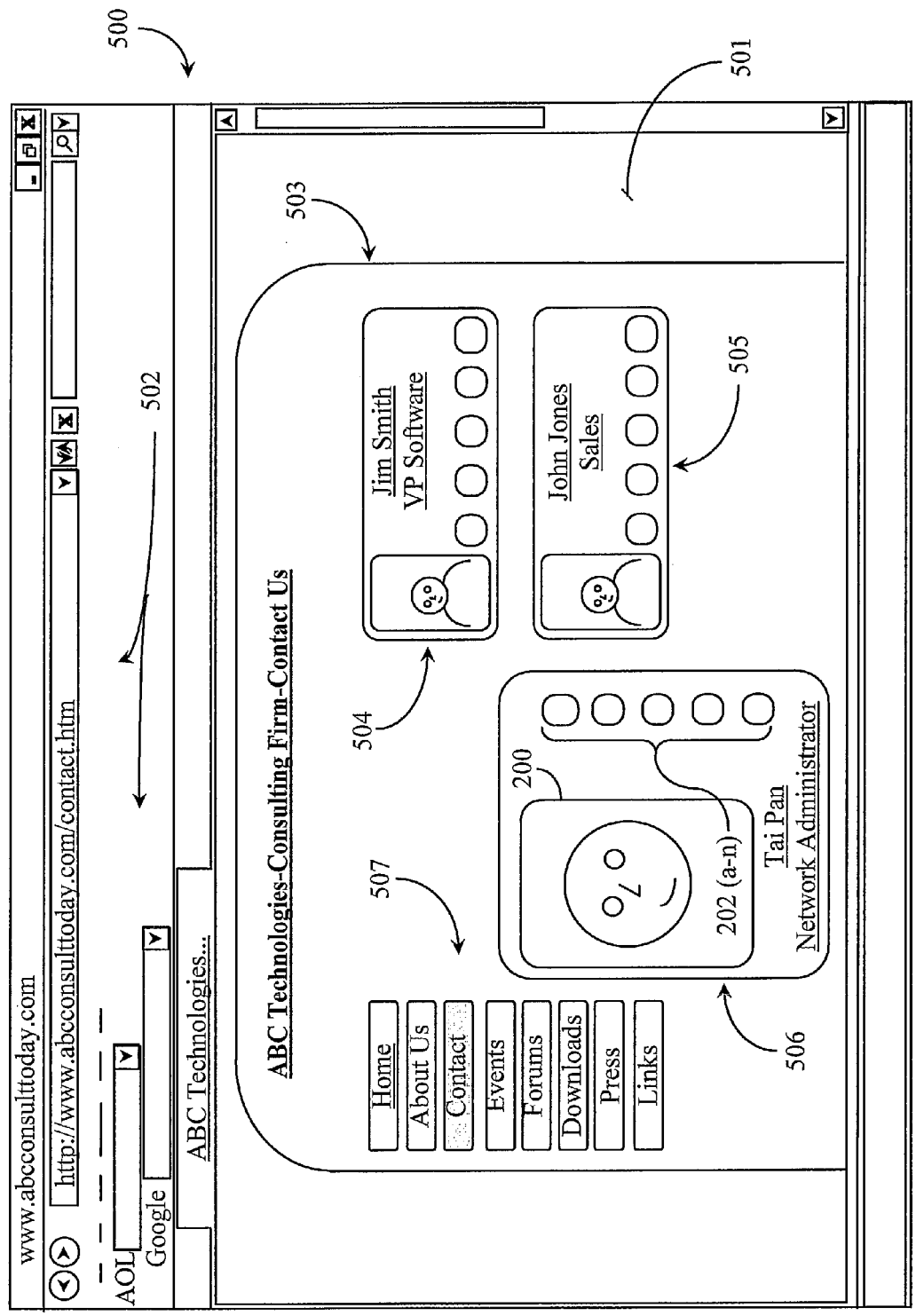
FIG. 6 is a block diagram illustrating various interactive windows presented in various configurations into a Web page 501 according to an embodiment of the present invention.

FIG. 6 is a block diagram illustrating various interactive windows presented in various configurations into a Web page 501 according to an embodiment of the present invention. The user typically uses a browser application 500 to display a Web page 501 that contains 3 inserted distributable clients (interactive windows) that are displayed in this case as a result of Web page loading where all 3 of the clients are executed and the windows visible to a user. Browser interface 500 is typical of an interface that may be used to browse Web pages on the network. At the top of the interface, typical browser elements and user options and menus are found including search fields; web address navigation field and so on typical of any browser application.

In this example, a Web page 501 having a URL of http://abcconsulttoday.com/contact.htm is displayed as an exemplary contact page that might be navigated to from a home page of the site abcconsulttoday.com. Graphics 503 of contact page 501 include a list of navigation buttons 507 for site navigation, a contact navigation option shaded to indicate that it was selected to load page 501. The executed clients result in display of interactive window 504 for contacting persona Jim Smith, role (VP software), window 505 for contacting persona John Jones, role (Sales), and window 506 for contacting Tai Pan, role (Network administrator).

In this example, interactive windows 504, 505, and 506 are dynamically built as a result of the trigger of loading the Web page 501. That is to say that all three distributable clients inserted in the page were executed at essentially the same time. The information for creating each interactive window is dynamically served to each server client by a host server such as ES 112 described with respect to FIG. 1 further above. In one embodiment, hyperlinks may be presented on contact page graphics 503 for the three contacts represented so that a user may select one to "order" an interactive window for that persona. In one embodiment with windows 504, 505, and 506 open, there are three server connections to the server or one for each client executed. In one embodiment, if one client is executed and has an open interactive window served through an open server connection, then subsequent executions of clients in the same Web host may use the single server connection to receive the build instructions and data for dynamic display of the associated interactive windows.

Windows 504 and 505 are standard thumbnail views each containing a thumbnail picture of the represented publisher the personae names and roles includes and a plurality of action buttons arrayed across the bottom of each interactive window. Interactive window 506 represents a "face view" and has a much-enlarged picture of the publisher including persona name and role and including interactive action buttons or indicia 202(a-n) arrayed in a vertical column to the right of the picture. In one embodiment, the view may be similar to the way baseball cards look, for example, personae belonging to an iGroup that is a sports team might all have branded baseball card panels that can be moused over or clicked once to reveal a backside of the card with information about the player visible. Such iPanel representations may be printed out to physically replicate the branded card with the player's picture, years of service, and with team and player statistics available on the reverse side of the card.

It should be noted herein that other custom views different than those described above are possible including dynamic view variations that are dependant on the location of the distributable client or type of device used to execute the client codes to call the interactive windows into display without departing from the spirit and scope of the invention.

Windows 504-506 may, in one embodiment, all be ordered simultaneously by the act of selecting contact from page navigation options 507. In another embodiment, they may be ordered separately from the loaded contact page 501 by separately clicking a link associated to a publisher, the link invocation serving to execute the associated client code. In this case, persona roles identify each interactive window.

Jim Smith as a publisher may own more than one personae and role. The role illustrated in window 504 is Vice President (VP) Software. Jim Smith may also be the press contact for the site and may have a distributable client code inserted into a press page of the site that may be associated to entirely different interactive window features and contact options for the press. Therefore, if a user clicks on Press in navigation options 507 and navigates to the press page, an interactive window for Jim Smith (Press contact) may be ordered having completely different contact information associated with that role. In this way, Jim may protect is identity and manage his incoming flow of communication requests according to roles he plays within the company. Because the service of the invention is dynamic, state and/or presence information may be incorporated into the communication actions if selected by a user. The user while online may select any of the action indicia on the face of the interactive window to call up a second window to initiate a communication with the contact according to action constraints. The pertinent contact data of the customer is withheld from the user so that the user does not have email, IM, telephone, or other contact data that the publisher does not want the user to have.

Figure 7:
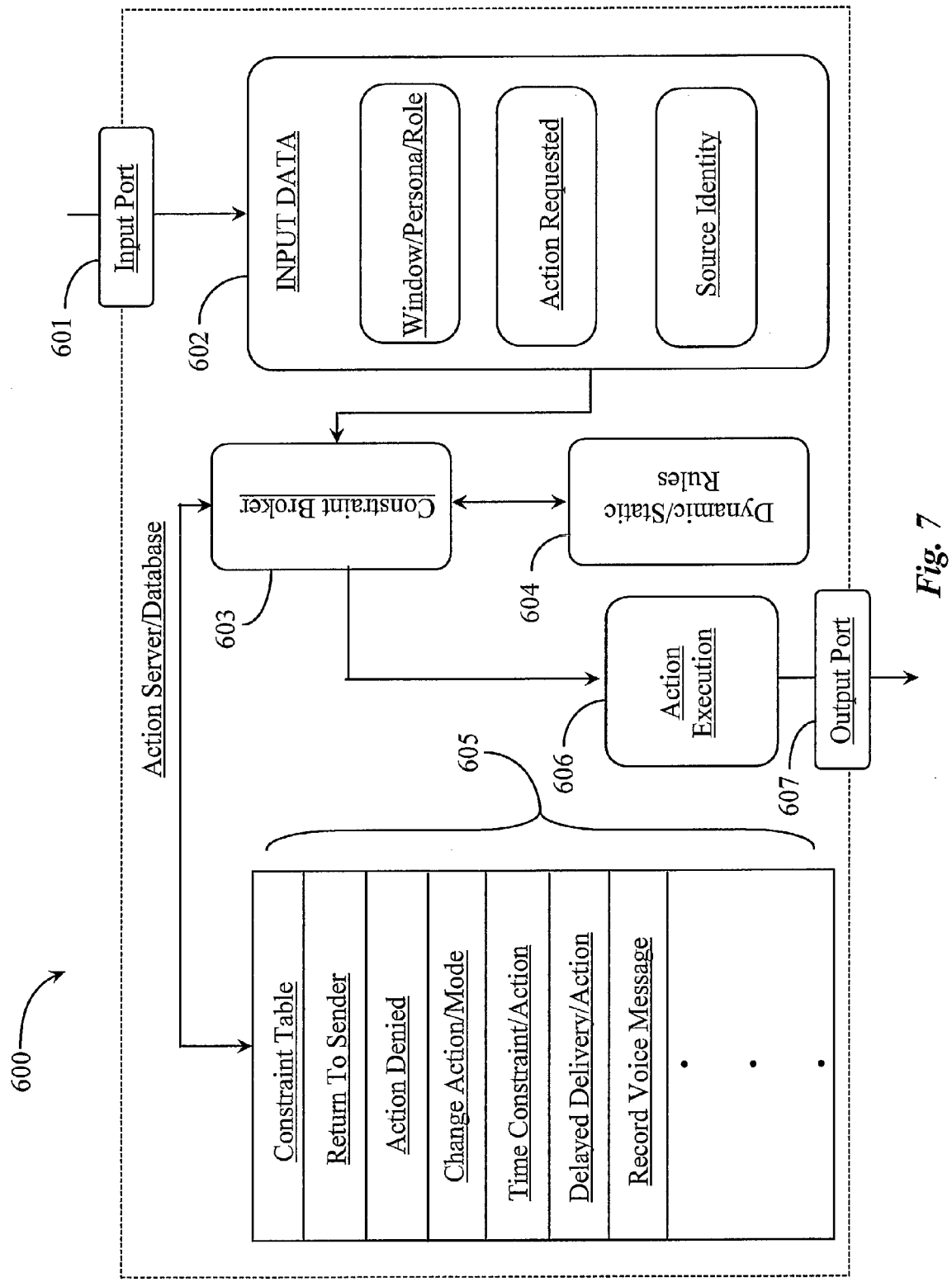
FIG. 7 is a block diagram illustrating an action server and database 600 engaging in constraint application relative to a requested action according to input data in an embodiment of the present invention.

FIG. 7 is a block diagram illustrating an action server and database 600 engaging in constraint application relative to a requested action according to input data in an embodiment of the present invention. As described above, a user interacting with an interactive window by selection of an action button initiates contact with a publisher. The actual contact action is performed by a server analogous to action server component 112a of FIG. 3 as a result of input received through an input port 601 of the server.

Input data 602 arrives at the server from the executed server client as a result of user interaction with the interactive window of the client and includes identification of the interactive window the user has interacted with by persona and role. Input data 602 includes identification of the action mode (contact option) selected by the user to initiate contact. The data input into the second interactive window includes the source identity of the user such as the user name or handle and the address information or number of the user associated with the action mode selected.

Other information may be known by the action server including the server client URL address, the identity of the accessing machine (serial number), the network IP address of the accessing machine, and the network address of the host machine of the server client. However the only information required in order to initiate a contact on behalf of the user is the identity of the publisher and role which serves to identify the interactive window served to the user as a result of code execution, the identification of the requested action, and the source identity information of the user associated with the action request. In some cases, there may be some challenge/response interaction required before an action can be initiated by the user such as entering a PIN number or password. A validation sequence for the entered information may also be required in some cases before an action can be considered.

In one embodiment, a communication broker 603 is provided that has access to a set of dynamic and static rules contained in a rules base 604 that may be associated in part with the publisher of the specific persona and role serving to identify the interactive window. Routing may be primarily governed by the publisher identity associated to a particular iPanel. Static rules may be pre-defined and associated with a persona and role of a publisher, associated with a requested action indicia, and associated with a source identity input by the user. For example, in input data 602 if an action requested is an email communication and the source identity is on a blacklist maintained by the publisher for the persona configured to the interactive window then the state of the event "User on Blacklist" may determine the action of the server and which action constraint from a constraint table 605 to apply to the request processing.

Action constraints are provided in action constraint table 605 and include but are not limited to Return to Sender; Action Denied; Change Action/Mode; Time Constraint/Action; Delayed Delivery/Action; and Record Voice Message. There may be many other constraints listed in table 605 without departing from the spirit and scope of the invention; however the several listed here serve well in explanation of the invention.

Communications broker 603 having knowledge of the source identity, the action requested, and the window identity (persona, role), can search rules database 604 for rules that may be pre-defined for the window, source, or action, or all of these. Presence and state information may also be incorporated and run against the rules. Based on the outcome of this process, communications broker 603 may select the appropriate constraint from table 605 to apply to the resulting action that the server takes. An action execution module 606 is provided to execute any server action resulting in an output such as an email sent or a call dialed, for example. The resulting action is output through the server output data port represented herein by output port 607. The server may have more than one input and output port as well as queues and other server components not illustrated here without departing from the spirit and scope of the present invention. The representation here is logical only.

In one embodiment, constraint broker 603 is spawned as a personal instance of constraint broker for one individual publisher that may be a member of a trust network or iGroup of individuals with a high level of implied trust among themselves. In this embodiment, the broker has access to the member's interaction history in the group and, perhaps other groups the member may be involved with, perhaps using other personae. In such as case, one broker may consult other brokers to help determine in an advanced way whether a user should be trusted or not from a group level standpoint.

To illustrate the concept, a user may attempt contact with one member and may enter the appropriate source identity for initiating the contact. The member may have a trust level metric of not trusting new contacts not already listed in a trust list. However, the contact may be already listed in another members trust list which the current member trusts as well. Broker 603, may then check rules 604 and additionally, run the identity against the trust interaction history of the entire group to determine if the identity has trust already established elsewhere in the group. If so, the broker may, by rule, override the individual members trust level governing that identity. The process may also work in reverse where the individual might have allowed the contact but the identity has a history of not being trustworthy in interaction with other group members. Broker 603 may consult with other personal brokers or there may be a master broker provided that handles group level trust metrics and has access to all member interactions and trust metrics applied in those interactions.

To continue discussion of the process of constraint application to output using the example cited further above, if the user (source identity) is on a blacklist maintained by the publisher for the persona for the communication action requested, the broker 603 will consult the rule associated with that blacklist and select the appropriate constraint "Action Denied", for example, from table 605. Therefore, the server output will essentially be a denial of action or "request denied" to the user. This output may be propagated in several different ways depending upon the mode of communication requested. The server has access to the return address information of the source and can generate an error or denial message to that address. The server may serve a pop-up message to appear on the Web page the user is working from. In telephony, since the user is first called before the publisher is called, the first call attempt would never be made in the case of a service denial.

An action constraint may be tied to presence information or other state information about a publisher. For example, if a user is attempting a telephone contact, but current presence information indicates that the contact is in a conference call, then a rule may be available that directs the communications broker to select the constraint "Record Voice Message". Again, because the server may know the state of the publisher it never has to dial the publisher it may simply call the user instead and using IVR or automated attendant, ask that the user record a message. In another embodiment, the server may by default dial into the voice message service and then call the user and connect the user to that service when the user answers the telephone.

Rules for source identities, personae, roles, and action indicia may be changed at any time with such changes manifesting the next time a user orders an interactive window through code execution. For example, a contact email address or telephone number may be temporarily disabled for some reason. The state may be recorded and the next time the window is ordered that action indicia may be grayed out and not selectable. Action indicia may no longer be pertinent for a persona of the publisher in which case the indicia can be dropped for that window. Likewise action indicia may be added for persona represented in an interactive window at any time.

Action requests that make it through the server to output are forwarded to the appropriate routing mechanisms or service machines that have the capability of establishing the communication event whether it be a message, voice mail, telephone call fax message, Instant message, SMS, or other type of communication event. In all embodiments of the invention a publisher can only be contacted by a user through the action server when . . .

1. A server client has been executed
2. A server connection is opened between the server and the executed client
3. The first Interactive window has been served and displayed
4. The user has invoked a contact option presented in the first window
5. A second interactive window is served and filled in by the user and
6. The action request submitted to the server over the server connection If the user is trying to get a map of the publisher location or simply ordering a publisher profile or some other data published through the interactive window them in place of step 4, the user would click on the map button or profile button. This sends a request for the data to be served and displayed, perhaps in a second window adapted to present the ordered data. If mapping is requested the request may be a link to Yahoo™ or Google™ mapping services which may also include a third-party option for getting directions in which case the user would have to enter a user address.

Figure 8:
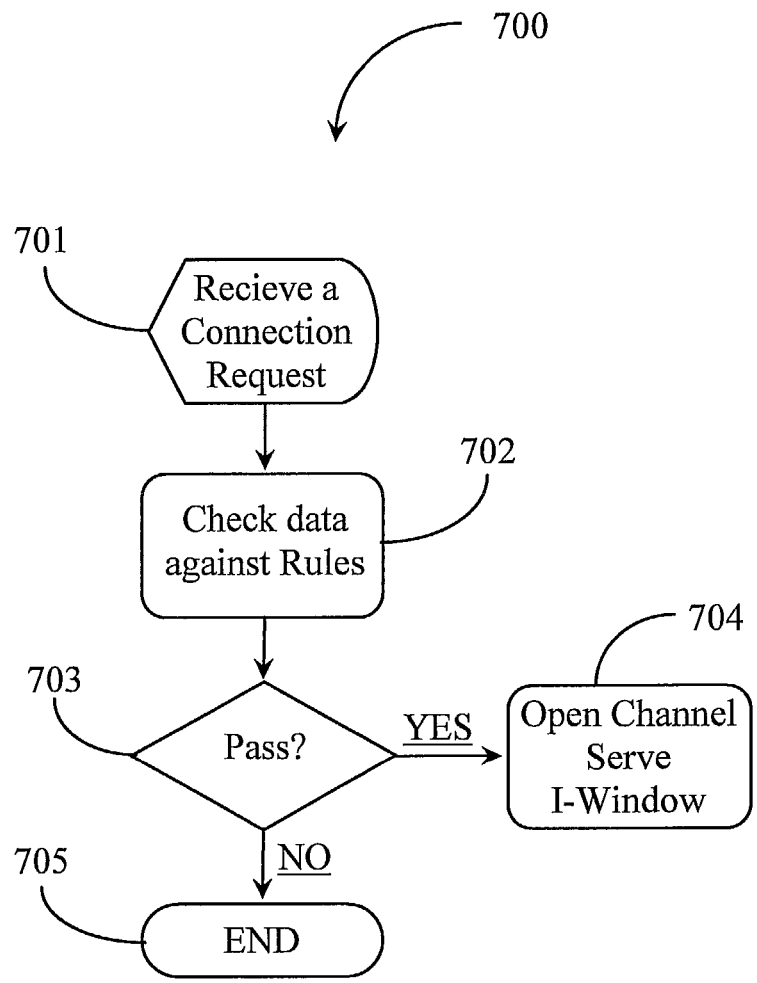
FIG. 8 is a process flow chart illustrating server steps 700 for determining valid code execution of a server client.

FIG. 8 is a process flow chart illustrating server steps 700 for determining valid code execution of a server client. In step 701, an action server analogous to server component 112a of FIG. 3 receives a request from a distributable server client resulting from execution of the client code or identifier inserted into a host such as a Web page, for example. In this step, the executed code includes a procedure for requesting the server connection and further instructions for retrieving the required data over the opened connection for building the interactive window termed the iPanel by the inventor.

At step 702, the server checks data associated with the request against a set of available rules governing the process. The rules set may, at least in part, be pre-configured by a publisher owning the server client code. One rule might define approved network locations from whence a connection may be approved. The publisher has control in this case whether the code execution will result in an open connection with the server. Another rule may be in place that restricts device types that may receive an open connection as the result of code execution. Other rules may be in place for determining what type of window data will be served to the client for display. For example, a rule may define layout or resolution or some other build option based on location of code execution or device type that has executed the code.

In this example, the server checks these rules before granting an open connection to the client. At step 703, the server determines whether the conditions of execution pass the rules process or not. The server may determine certain data from the original request sent upon code execution such as the network location of the client, the network location of the host of the client, and the network address and/or identification of the machine that caused the code execution. The host machine type may also be recognized by the server. In some embodiments, platform identification of the machine that will display the interactive window of the open connection if established may be known.

At step 703, if the request passes the evaluation and there are no conditions to override a server connection, then a server connection between the server and the client is opened at step 704. In step 704, the server also serves the interactive window for display, through the host, on the accessing machine. In the service of the required data for building the interactive window, the exact data served to build the display may vary according to one or more rules. One rule may allow a server connection for any accessing machine with a display but may require different versions of the window data for different machine types or platform types. So the exact data served to build the interactive window may depend in part on display device type, platform type of the display device, server client location, display device identification, etc.

In step 703, if the code is executed and the request data does not pass the evaluation the request to open a connection with the server is denied and the process ends at step 705. The publisher has the ultimate control over the distribution of the sever client code. The server client code can be pasted or "moved" by a user to other host locations. The publisher has final authority through the establishment of rules relative to successful execution and server interaction between the service of the invention and users who wish to contact or interact with the publisher or published content provided by the publisher through the interface.

Figure 9:
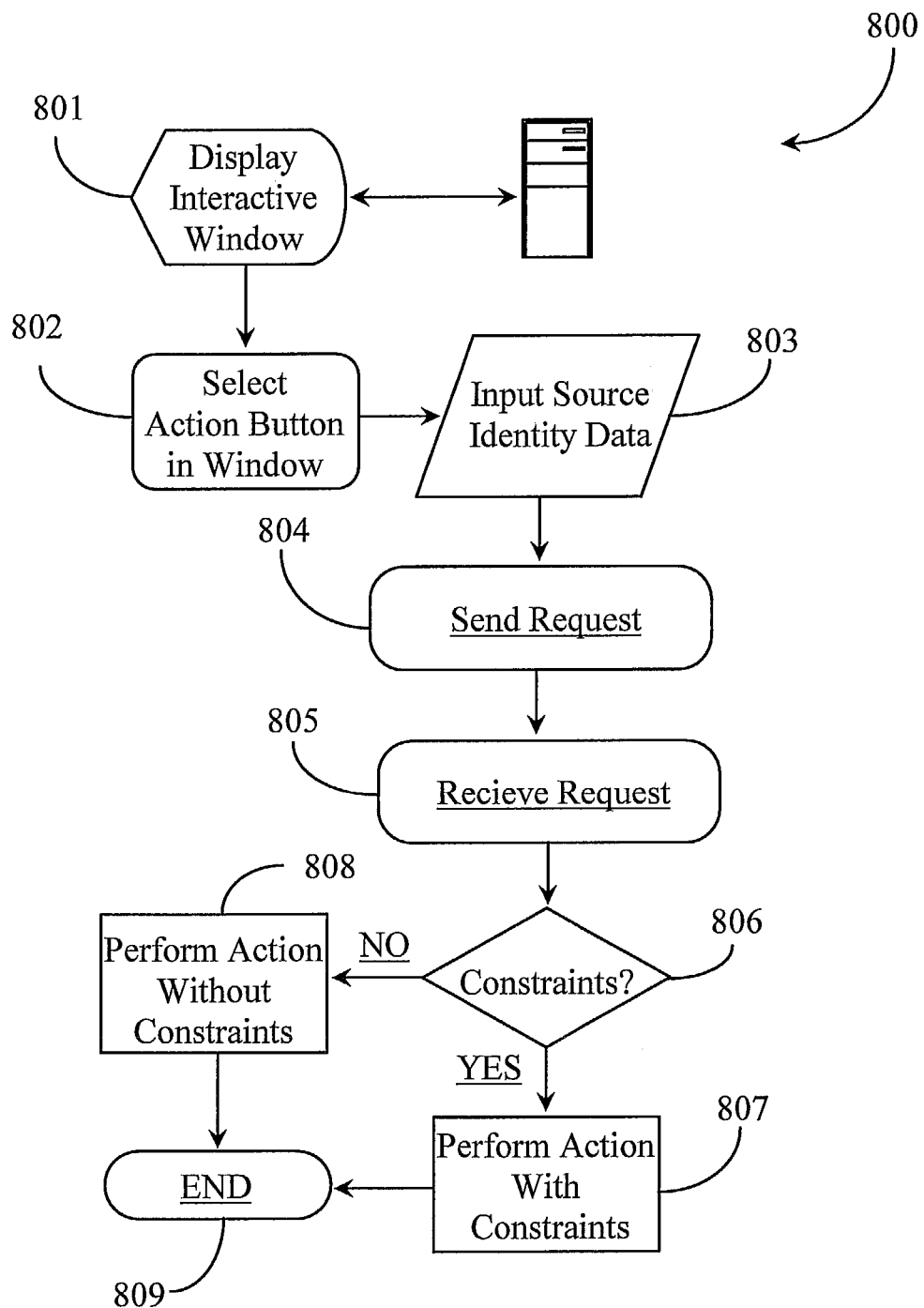
FIG. 9 is a process flow chart illustrating steps 800 for user initiation of a contact action and server response according to an embodiment of the present invention.

FIG. 9 is a process flow chart illustrating steps 800 for user initiation of a contact action and server response according to an embodiment of the present invention. Process steps 800 begin after a sever client code has been executed and the server has opened a connection to the client and served an iPanel for display. At step 801, the user device displays the interactive window. At step 802, the user may select an action button from the interactive window to initiate an action relative to interaction with the publisher. This process assumes the action selected is a communications related action such as a telephone request or a messaging request. Selection of the action in step 802 causes a second interactive window to display analogous to windows 300 or 400 described further above for enabling the user to input source identity data and contact data at step 803.

At step 804, the user sends the request to initiate the action to the action server over the opened server connection. At step 805, the server receives the request in queue and may begin processing the request according to queue processing rules. At step 806, the server determines if there are any constraints in place relative to the requested action. If there are no constraints in place or active then in step 808, the server performs the requested action without any constraints. The process ends at step 809. In step 806, if the server determines that one or more constraints are active for the request then at step 807, the server performs an action according to the applicable constraint or constraints. The process ends at step 809. The server action in step 806 may vary according to the exact rules in place at the time of the request and can range from a service denial to performance of an action tangential to the request. For example, if the request was to reach the publisher by telephone and the publisher had a rule that users should leave a message between the time of 1:00 PM and 2:00 PM and the request was received at 1:30 PM then a voice service may be used to ask the user to leave a voice message for the publisher.

Figure 10:
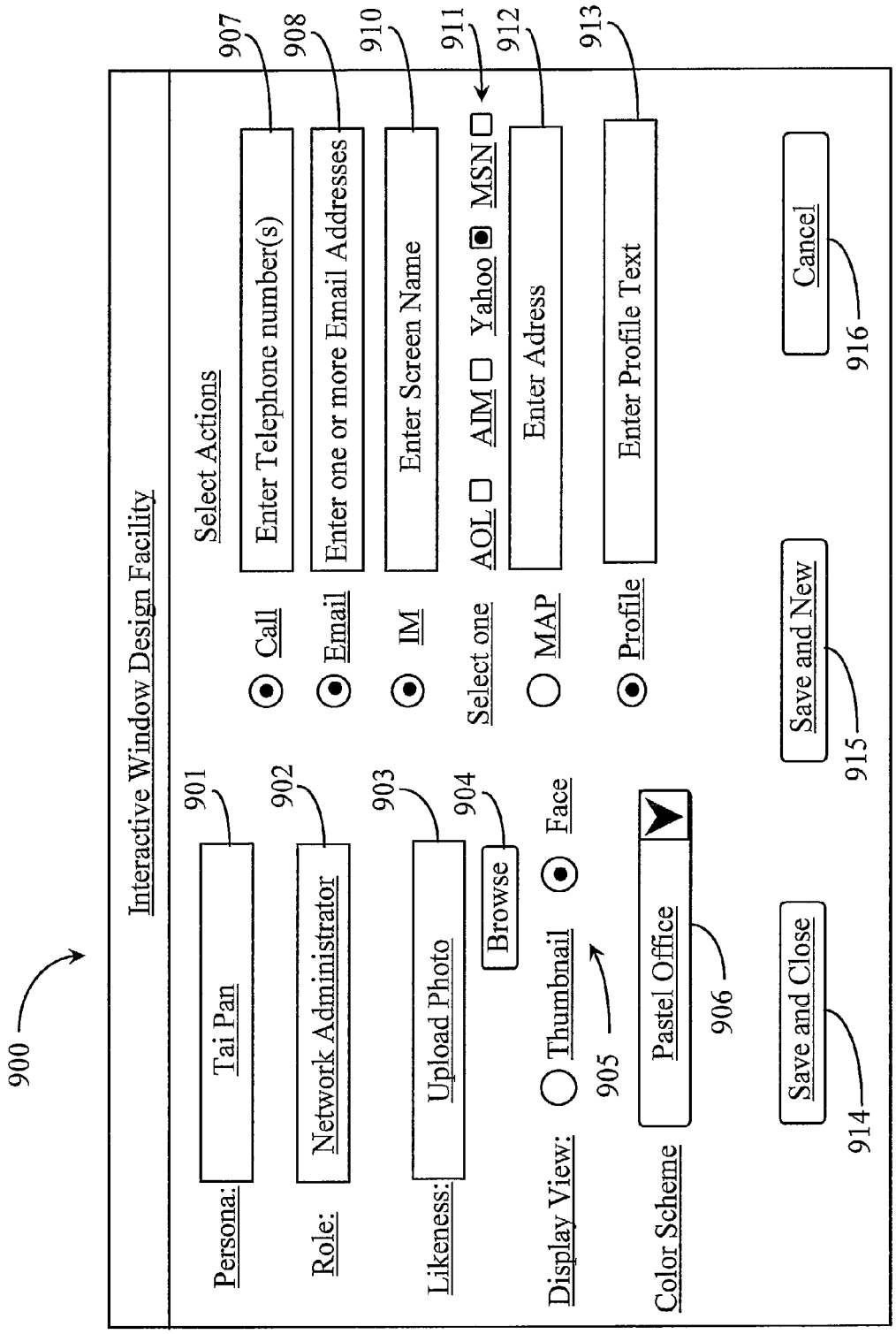
FIG. 10 is a block diagram illustrating a facility 900 for designing and saving interactive windows according to an embodiment of the present invention.

FIG. 10 is a block diagram illustrating a facility 900 for designing and saving interactive windows according to an embodiment of the present invention. Facility 900 represents a tool or design facility made available to customers of the service of the invention to use for designing and configuring their iPanel attributes and features. Design facility 900 may be provided as a server-based tool accessible through configuration server component 112b described with respect to FIG. 3 above, or it may be provided as a customer desktop utility. In a preferred embodiment, customers use the service of the invention to protect their contact information and use the facility to create their own interactive iPanel configurations. A publisher may create as many iPanel configurations as desired using the tool. Facility 900 may be provided as part of a personal "Dashboard" interface that may be offered to those who sign up to begin using the service.

In one embodiment configuration server component 112b may also include a access for service knowledge workers or other authorized persons to view statistics of usage of the system. Such personnel may be authorized to view both statistics of usage and activity of individual persona and that of a group persona. If a branding service is used, a branding agent may be authorized for viewing brand consumption statistics like impression and click-through usage statistics for a group or individuals. Statistical reporting may be, in some cases pre-configured, and can be pushed to third party systems as regular reporting. Advertisers may also be authorized to view similar statistics like ad service statistics including impression and click-through stats.

Facility 900 includes a persona field 901 enabling a customer to enter a name or persona that they wish to represent them. Facility 900 includes a role field for a customer to enter a role for the window. The customer may use many name variation for the persona such as a nick name, sir name, first name, or handle. A role can be any position or title the customer chooses. A role may be chosen that is real, comedic, fictitious or otherwise. A role can include a relationship statement such "goalie of the team and son of the coach".

To illustrate one possible application, an iGroup may be assembled of neighbors in a neighborhood to form a neighborhood watch iGroup. Members of the group may have published pictures of their kids, pets, etc on their iPanels. A member may, if a pet or kid goes missing send an email blast to all of the other group members including a picture, description, and concern statement. Such a blast may include an audible cell phone alert and/or land line alert that will also be propagated to all of the members' cell phones and/or land lines if the situation is an emergency.

Facility 900 includes a window 903 and an associated browse button 904 enabling the customer to upload a photo or relative media such as a likeness of the publisher. This photo, which may be an image, short video, an animation, or a cartoon, may be connected to the role the publisher is adopting for the window. A display view option 905 allows the customer to select how the interactive window will display according to provided options. In this case, the options are thumbnail view or face view.

A drop down color scheme menu 906 is provided to allow the customer to select a color scheme for the interactive window. A range of color schemes may be provided. The customer may develop his or her own personal scheme in one embodiment using known design tools that may also be made available to the customer along with facility 900. In one embodiment, branding is available where the publisher may select a "skin" artistically designed to dress the interactive window and to promote a specific brand authorized by the service.

Facility 900 includes one or more action option that a customer may select to include as user-selectable contact options in his or her interactive window. The option Call includes a field 907 for entering one or more telephone numbers. The option Email includes a field 908 for entering one or more email addresses. The option IM includes a set of messaging options 911 for enabling the customer to select which of supported IM messenger he or she wishes to use to receive messages. An IM field 910 is also provided for entering the screen name of the customer for the messenger option selected.

A map option is provided with an address field for entering the address or cross streets for a location the customer wishes to provide a map for and/or directions to. A profile option is provided with a field 913 for entering profile or bio text for the customer. The bio or profile text entered may relate to the role the customer has selected.

Facility 900 has a Save and Close option 914 for saving a current configuration and then quitting. Facility 900 has a Save and New option 915 for saving a current configuration and then staring a new interactive window. Facility 900 also has a Cancel option for cancelling a current configuration. In one embodiment, a delete option may be provided for deleting current interactive windows that are no longer desired. In this case, each configuration is saved and can be recalled by the customer. The mapping service may be any known third-party service.

Figure 11:
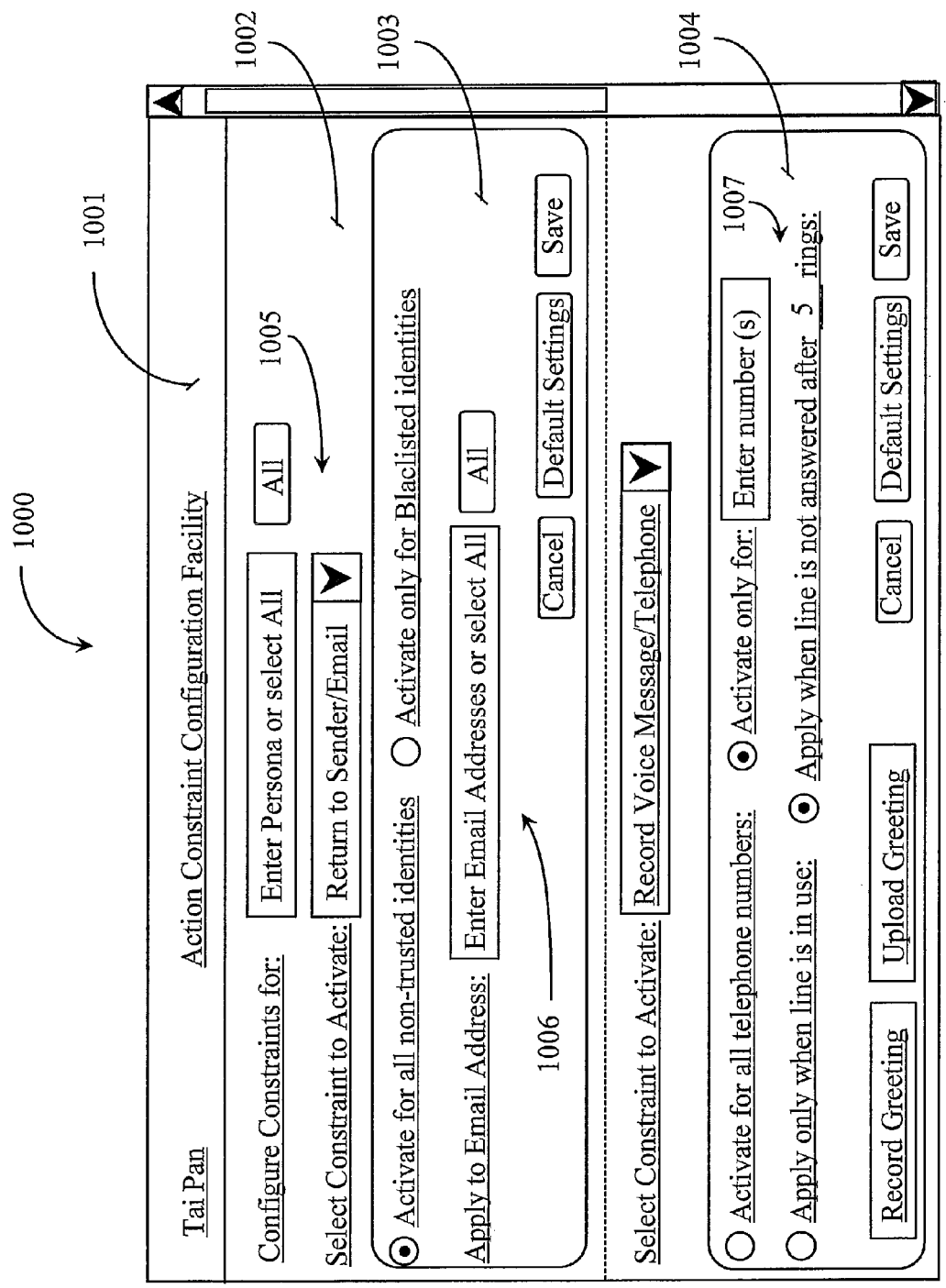
FIG. 11 is a block diagram illustrating a facility 1000 for configuring action constraints according to an embodiment of the present invention.

FIG. 11 is a block diagram illustrating a facility 1000 for configuring action constraints according to an embodiment of the present invention. Action constraint configuration facility 1000 may be a tool made available through a dashboard interface along with configuration facility 900 described above. Facility 1000 has a title bar 1001 indicating the name and role of the owner of the interactive window that constraints are being configured for. In this example, the name and role identify the iPanel configuration for which constraints will be configured using facility 1000. In one embodiment, the name and role indicia comprise name and role fields in which the name and role may be changed to call up a constraint configuration window for another interactive window. In one embodiment, facility 1000 may be invoked for an interactive window from the design facility used to create the window.

Facility 1000 has a workspace 1002 that may be scrollable depending on the extent of content for display. In one embodiment, facility 1000 is generic and includes a data-entry box for entering the persona and role identifying the window and also includes set of drop down menus 1005. A first drop down menu is provided for selecting an action available to users of the interactive window to configure constraints for. A second drop down menu is provided for selecting constraints to activate for the action. In this case, the constraint selected for the persona Tai Pan Network administrator and the action Email is Return to Sender.

Once the first part of the facility form is correctly filled a dynamic window appears to enable continued configuration according to a next logical step of associating a rule and email address to the constraint Return to Sender. A dynamic window section 1003 contains related options for continuing configuration of the constraint Return to Sender. A set of options is provided in window 1003 for activating the constraint Return to Sender for all non-trusted identities or for only black listed identities. An identity on a black list may be a name, and email address, or both as an entry.

Configuration window 1003 includes a text box 1006 for entering one or more email addresses or for selecting all email addresses to activate the constraint for. Standard options Cancel, Default Settings (view), and Save are provided in the dynamic window. In one embodiment, the customer may continue to select constraints for the action email to bring up new dynamic windows to fill in until all of the desired constraints are activated for the desired email addresses.

After configuring constraints for email, the customer may select another action to configure action constraints for such as Call/telephone. In this case the customer has selected the action "Call" and the constraint "Record Voice Message" from a dropdown menu set 1007. In one embodiment, there is only one drop down menu set for selecting actions and constraints for configuration. For example, a customer may select an action and configure all of the selected constraints for that action, and then select a next action in the same menu whereby the constraints for that action are selectable in the adjacent menu. The illustration of two menu sets is for illustrative purpose only.

After selecting an action and constraint, a dynamic window 1004 may be served with configuration options 1008 presented. For the action Call and the constraint Record Voice Message, options 1008 include exemplary options "Activate for all telephone numbers"; "Apply only when line is in use"; "Activate only for" followed by a text field for entering one or more telephone numbers; and "Apply when line is not answered after _____ rings" where the space is adapted to accept a typed number. The options just described are exemplary only. There may be more options presented without departing from the spirit and scope of the present invention. In one embodiment custom rules may be created such as "Record voice message if _____ calls" where the blank is adapted to accept a name or source number.

Window 1004 contains some other options 1008, for example, one for recording a greeting and on for uploading a pre-recorded greeting. Standard options for cancel, default settings (view) and save are also illustrated. In this example, facility 1000 is a scrollable facility. Certain configuration options may exist by default for all supported action constraints.

Figure 12:
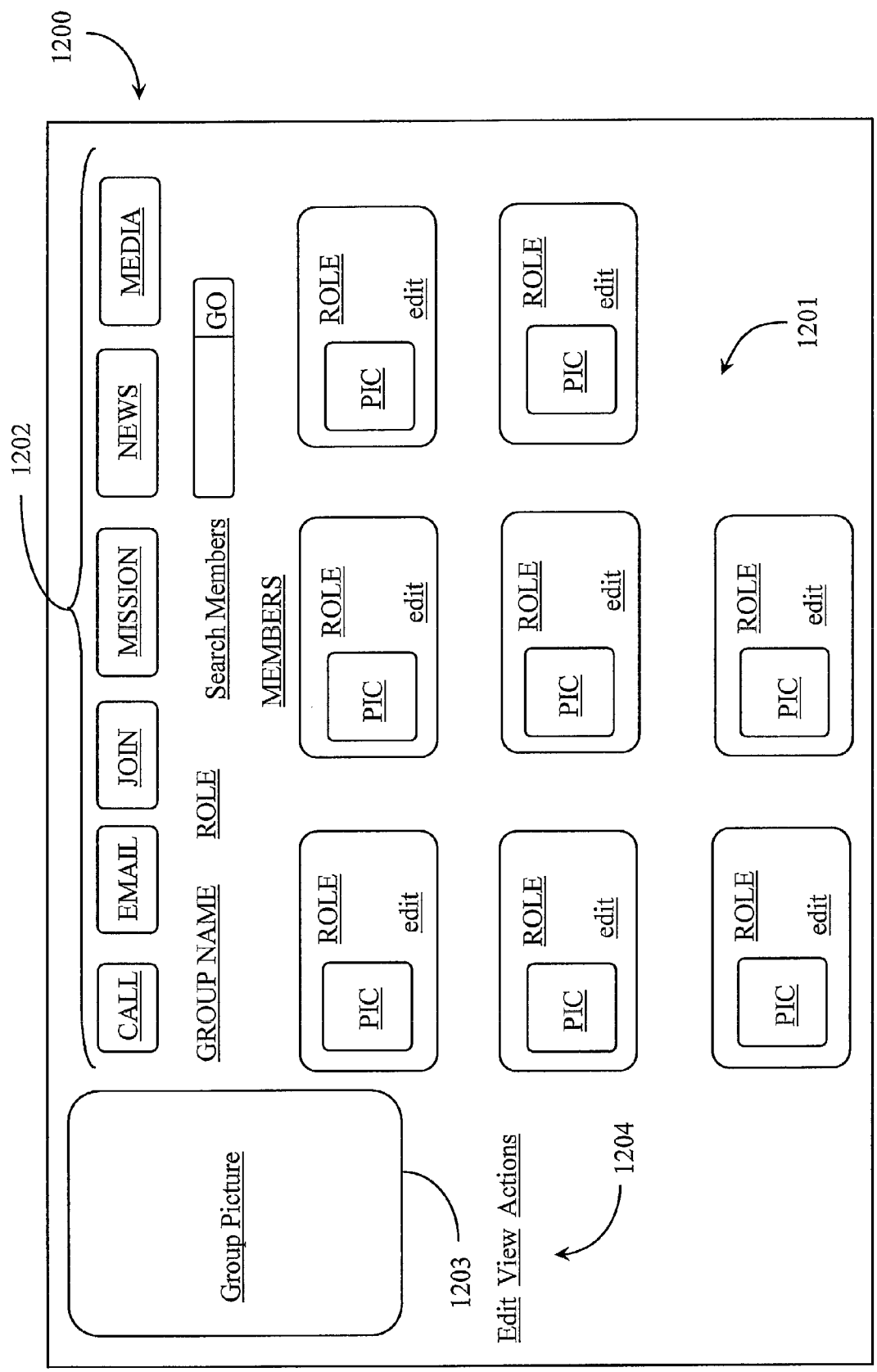
FIG. 12 is a block diagram illustrating an iGroup Panel 1200 and associated member iPanel icons.

FIG. 12 is a block diagram illustrating an iGroup Panel 1200 and associated member iPanel icons. As described further above in this specification, iPanel users may belong to a socially networked group of individuals defined by an iGroup Panel that may be administered by a trusted member of the group. As iPanels enable communication while protecting identity for individuals interacting with users, they may also used for intercommunication between iGroup members who respect identity space amongst themselves. An iGroup may also be used to propagate any publishable materials to be shared by group members, the members using individual IPanels to access the published materials. Example of these may include but are not limited to shared email addresses or contact points, group maps, video or other media collections, and the like.

iGroup panel is an iPanel interactive window executable from a sever/client code just as the iPanel described further above. Therefore, interactive window 1200 is an iPanel used by a group administrator to maintain and moderate group members illustrated in this example as iPanel icons 1201 visible within interactive window 1200. Icons 1201 representing individual executable iPanels may be viewed differently within window 1201 such as tall icons instead of wide icons, or a list view that lists the personae, roles, and any contact information and contexts that are not protected masking contact values that are protected. An option may exist for an administrator to view all contact information in list view in an unprotected manner.

In one embodiment, a list view of iGroup members iPanels may be assembled as the result of entering one or more tags applied to individual members. For example, one may order a list of all of the "players" of an iGroup that is a hockey team by using the tag "players" to assemble the list. Players that have multiple tags such as players and midfielders could be isolated quickly by using the additional tag midfielders along with players to assemble the more granular list. This embodiment is not dependant on list view as the display be set for iconic view including wide view, tall view, or even a baseball card style view of each member iPanel.

Interactive window 1200 as a distributable client can be distributed to host locations such as Web pages or Web-integrated documents and applications running on electronic appliances by inserting the code snippet (client code) into the host page, application, or document. Execution of the code may occur upon a trigger as described relative to iPanel execution.

Interactive window 1200 representing an iGroup may be created through a dashboard interface using a facility similar to facility 900 for configuring an iPanel for an individual. A group picture 1203 may be provided in the form of a jpeg, gif, or png format. Likewise an audio or audio video short presentation as well as animated cartoons or avatars may also be used instead of a still image. Depending on the group identity, an insignia or some other artistic rendering of a group logo or the like might be used. Some iGroups may be restricted for security to members interacting within the confines of the group with no outside communication. In this case authentication may be required to activate an iPanel of any of the group members in order to interact with the window features. Window 1200 includes a space for the name of the group (GROUP NAME) and for a role of the group (ROLE). An example might be Group Name—United Church Women's Association and the Role of the group might be At Risk Youth Support Network.

Like an iPanel, an iGroup panel may include action buttons 1202 allowing users who have executed the client code to display window 1200 to learn more about the group (MISSION, NEWS, MEDIA), call the group (CALL), email the group (EMAIL), apply for group membership (JOIN), or request some other action relative to the group. The action buttons may be subject to rules and constraints as described relative to the iPanel. The identity protection features may also be extended to the group action options 1202 in general in some cases. For example, a secret sorority may require complete anonymity with respect to outside users who may request interaction with one or more of the groups members who may be unknown to the user. A law enforcement group or task force may use iGroup capabilities to receive information from outside the group without compromising any information about the group or group members.

Members 1201 are each executable from interactive window 1200 by virtue of being nested as individual iPanels within the window. Therefore, a user who executes the iGroup code and displays window 1200 may navigate through members 1201 and execute the code for any one of them to receive an iPanel for communicating to that member. In this regard, publishers who are members of the iGroup may contact other members through their iPanels by executing them from the administration interface or from any other distributed location. In one embodiment, an iGroup member may contact another iGroup member by sending a message using the iPanel the message including the client code for the requester's iPanel, which may be executed in a displayed email message or from an IM interface. An administrator may, in one embodiment click edit within any of the member icons to open a configuration facility for editing that iPanel member configuration. In one embodiment, iGroup members may be enabled to edit their own configurations if desired, or the configurations of others whom are trusted. In one embodiment, an iGroup is a family network and a mother, for example, may edit the iPanels of the father and all of the children/

It is noted herein that an iGroup panel is deployable and the individual iPanels associated with the group are also deployable. If a user not belonging to the group executes any of the iGroup member panels, the panels might contain indicia indicating that this member belongs to an iGroup and an action mode button for linking the user to a location containing the iGroup panel. Therefore, communication can occur separately using iPanels of iGroup members and those panels may provide access as well to the main group panel for communication to the entire group or for contacting other iGroup members or the administrator(s) of the group.

In the case of member to member communication within the boundaries of the iGroup, email correspondence may take place wherein each participant's identity (email addresses) is protected from the other. Protection may also be one-way protection, for example, a pastor of a church group and iGroup member may contact parishioners, also members of the group using their iPanels whereby the identities, contact information is withheld from the pastor. A student group having one or more teachers mentoring them may also use identity protection afforded by the service to prevent the teachers from obtaining their cell phone numbers, email addresses, IM handles, etc. Likewise the teachers may wish to protect their personal contact information from falling into student hands.

Window 1200 includes administrative options 1204 which include the options Edit, View, and Actions. Option 1204 (Edit) is an editing option allowing the administrator to make configuration edits to the iGroup panel using a dashboard configuration tool. Clicking on Edit may be a shortcut to the appropriate configuration facility. Option 1204 (View) enables the administrator to view members 1201 in iconic form (Tall or Wide) or in list view form which includes all of the member details including contact information. One list view option provides the administrator with an unprotected view of the members' details so all of the contact information is visible. Another list view option provides the administrator with a protected view that masks the critical member information that the members want protected. In one embodiment, an administrator of an iGroup may only be allowed to view the protected version of the members list view.

A list view may be a column and row table where the columns identify member attributes and rows identify the members. A column heading for a list view may appear as follows:

| Member | Settings | Item | Label | Number-Address |
| --- | --- | --- | --- | --- |

Under the column heading "Member" for each row is the name and an optional relationship statement of each member of the group. Under the column heading "Settings" for each row are the role and any other settings for each member. A setting option may be that of administrator or group member. There may be more than one administrator for a group. Also under settings, there may be one or more tags attributed to the group member. Such tags may be added to members' settings and can also be used in a search interface provided within window 1200 as search criteria for searching members of the group.

Under the column heading "Item", for each row, the action items available for those members are listed such as phone, email, and map that might be listed for a specific member. Under the column heading "Label" for each row or the labels attached to each of the member's contact identities and addresses. A label may be added like a tag and may include work for a work number or address, home for a home number or address, the name of the group to specify a generic group number or address, mobile to specify a mobile number or address, and so on.

Under the column labeled "Number-Address" for each row are the actual member contact numbers and addresses. Numbers and addresses that are protected are not displayed and ones that are unprotected are visible. The numbers and addresses listed correspond to the labels provided in the preceding column.

Administrative option 1204 (Actions) provides a drop-down list of available actions that an administrator may take relative to the iGroup or members of the iGroup. The actions may include but or not limited to the following:

1. New Member—Adding a new member to the iGroup.
2. Tag Member—Applying tags to members settings.
3. Edit Email Addresses—Updating email information.
4. Send Invitations All—Blasting invitations to all group members.
5. Create Email Addresses—Creating email addresses for group members for identity routing purposes.
6. Import New Members—Importing new members from a file such as a profile V-Card or the like.
7. Export Members—Exporting members from the iGroup to another iGroup or to a file for import into another application.
8. Delete Members—Deleting selected members from the iGroup
9. Delete All Members—Deleting all members from the group (group disbanding).
10. Delete iGroup—Removes reference to the iGroup anywhere in the service.

The option 1204 (Edit) may bring up a configuration interface used to create the iGroup enabling the administrator of the group to edit attributes of the group.

An administrator may edit the iGroup name including a long name and a short name and the Role of the group. An administrator may change or edit the group picture 1203. An existing group picture may be swapped for a group slide show or some other presentable media such as the options previously described.

An administrator may create a domain and sub-domain for the iGroup and configure the domain host or registrar. Options may be presented in the configuration facility for configuring, testing and deleting the domain. A domain is required for assignment of iGroup email addresses for all of the members.

An administrator may edit tags applied to members as described above and may also configure email or voice "blasts" to be sent to members having certain tags. For a hockey team an email blast might be directions to a tournament sent to all members having the tag "player" or "parent". In one embodiment, a WIKI application may be part of iGroup functionality wherein each iGroup member may use the WIKI for group discussion, collaboration, and link-aggregation of resources. A WIKI application may also be provided to a single publisher iPanel and made available by an action button to those who interact with that panel.

An administrator may register the iGroup to a general telephone service number with further routing to member numbers performed based on identity. The administrator may also configure IVR services for the iGroup. The administrator may register the iGroup for third-party mapping services so any member can provide maps and directions to their locations. iGroups may also have a general iGroup map created that maps the physical locations of addresses that are common and/or important to the group. In an iGroup for example, a soccer team, the system may provide dynamically updated driving instructions to game locations that may part of an email blast to parents and players and that may be available to users accessing the iGroup interface.

An administrator may set the default member communications channels to be made available to each member of the group. And may further specify which member locations are authorized for those channels. The edit interface or group configuration interface may be saved or canceled after editing is complete. The actual interface may very in display format or appearance but may be similar in form to the configuration tools used to configure single iPanels and action constraints illustrated in FIG. 10 (Facility 900).

In one embodiment of the invention an administrator may apply a calendar constraint as presence information that may affect all of some members of an iGroup in terms of communication states and action options. For example, if an iGroup is a traveling soccer team then presence state for "Players" may indicate "Game Time" in each of the player iPanels during the actual time the players are engaged in a soccer game. A user attempting to contact one of the players may see this presence state, which may also include the time that the player will be available for communication.

With reference to a publisher having multiple iPanels, new presence terminology might be developed for indicating presence states. Right after work, an iPanel user might have a presence state "Play Time" configured to display to users. The state may automatically trigger a presence state of "Available" in one or more of the publishers more leisurely personae.

It will be apparent to one with skill in the art that the action initiation system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:

1. A communication management system, comprising:
   a first computerized appliance connected to a network and having a first processor coupled to a data repository with software (SW) executing on the processor from a non-transitory medium;
   a publisher being a member of a group of users who collaborate in one or more zones, each zone having a set of members and defined by a business or a social activity;
   a distributable client (DC) being a script of executable code and data created by the publisher, the DC stored in the data repository; and
   a rule set in the data repository, associated with the DC and with one or more of the zones;
   wherein the publisher causes the DC to be published to a second computerized appliance connected to the network, and to become a part of code of a web page, a network-integrated application or a network-integrated electronic document executing on the second computerized appliance, such that the executable code of the DC, in the case of the network-integrated application or a network-integrated electronic document, causes an interactive iPanel to display on a display screen of the second computerized appliance, and in the case of the web page causes the iPanel to display on a display screen of a third computerized appliance interacting with the web page at the second computerized appliance through a browser application, the iPanel display identifying a personae of the publisher that may be different for different zones, by both text and graphics, and providing in the iPanel display command inputs identified to initiate a particular communication protocol among two or more different communication protocols, one of the different protocols being email, and wherein, upon a user selecting a command input, the user is enabled to initiate a communication to the publisher in the selected communication protocol, and wherein, upon the communication initiated being received at the first computerized appliance, the communication is routed according to the rule set uniquely associated with the DC and with a zone identified through the personae of the publisher, or through identity of the user initiating the communication.

2. The communication management system of claim 1 wherein the DC is published to a plurality of computerized appliances in a plurality of different geographic locations, and wherein the location is considered in processing by the associated rule set for any received communication request.

3. The communication management system of claim 1 wherein the publisher is a member of a group of users who collaborate in a trust network, individual members maintaining trust metrics regarding other members and users, wherein the rule set includes rules at least partly based on trust metrics, and wherein, upon receipt of a communication, trust metrics are sought from members of the trust network to aid in determining processing for the communication.

4. The communication management system of claim 3 wherein determining treatment includes determining if the user initiating the communication request is a member of the trust network.

5. The communication management system of claim 4 wherein, if the user is not a member of the trust network, a communication is sent to the user asking if the user might wish to become a member of the trust network.

6. The communication management system of claim 1 wherein the DC created is a Group DC, and comprises personae identity of a group of users.

7. The communication management system of claim 6 wherein the group personae are associated as members of a zone defined by a business activity or a social activity.

8. The communication management system of claim 7 wherein the members of the zone are associated in a trust network specific to the zone.

9. A method comprising steps:
   (a) creating by a publisher being a member of a group of users who collaborate in one or more zones, each zone having a set of members and defined by a business or a social activity, by execution of software (SW) from a non-transitory medium on a processor of a first computerized appliance connected to a network and a data repository, a distributable client (DC) being a script of executable code and data, the DC stored in the data repository;
   (b) creating by the publisher a rule set uniquely associated with the DC and with one or more of the zones, storing the rule set in the data repository;
   (c) publishing the DC to become a part of code of a Web page, a network-integrated application or a network-integrated electronic document executing on a second computerized appliance connected to the network with the first computerized appliance;
   (d) displaying, in the case of the network-integrated application or a network-integrated electronic document executing on the second computerized appliance, by execution of the executable code of the DC, an interactive iPanel on a display screen of the second computerized appliance, the iPanel identifying a personae of the publisher, that may be different for different zones, in text and graphics, and providing one or more command inputs identified for initiating a communication in a particular protocol, among at least two different communication protocols, one of which is email protocol, and in the case of a web page, displaying the iPanel on a display screen of a third computerized appliance interacting with the web page through a browser application;
   (e) preparing and sending a communication to the first computerized appliance by a user interacting with the iPanel, the user operating one of the command buttons, selecting one of the at least two different communication protocols, the resulting communication directed to the publisher and identifying the interacting user;
   (f) receiving the communication at the first computerized appliance; and
   (g) executing the rule set associated with the DC and the zone identified by the personae of the publisher or identity of the user, and routing the communication according to one or more rules in the set and any discoverable information regarding the user initiating the communication request.

10. The method of claim 9 wherein the DC is published by the publisher to a plurality of locations, and wherein the location is considered in processing of any received communication.

11. The method of claim 9 wherein the publisher is a member of a group of users who collaborate in a trust network, individual members maintaining trust metrics regarding other members and users, the rule set including rules at least partly based on trust metrics, and wherein, upon receipt of a communication, trust metrics are sought from members of the trust network to aid in determining processing for the communication request.

12. The method of claim 11 wherein determining processing includes determining if the user initiating the communication is a member of the trust network.

13. The method of claim 12 wherein, if the user is not a member of the trust network, a communication is sent to the user asking if the user might wish to become a member of the trust network.

14. The method of claim 9 wherein the DC created is a Group DC, and comprises personae identity of a group of users.

15. The method of claim 14 wherein the group personae are associated as members of a zone defined by a business activity or a social activity.

16. The method of claim 15 wherein the members of the zone are associated in a trust network specific to the zone.

* * * * *